US012632453B2

(12) United States Patent
Diaz-Castillo et al.

(10) Patent No.: US 12,632,453 B2
(45) Date of Patent: May 19, 2026

(54) GENETIC-ALGORITHM-ASSISTED QUERY GENERATION

(71) Applicant: Express Scripts Strategic Development, Inc., St. Louis, MO (US)

(72) Inventors: Sandra L. Diaz-Castillo, Winter Park, FL (US); Stefan M. Riedling, West Hartford, CT (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 64 days.

(21) Appl. No.: 18/384,285

(22) Filed: Oct. 26, 2023

(65) Prior Publication Data

US 2024/0143591 A1     May 2, 2024

Related U.S. Application Data

(60) Provisional application No. 63/419,562, filed on Oct. 26, 2022.

(51) Int. Cl.
*G06F 16/2453* (2019.01)
*G06F 16/23* (2019.01)
*G06F 16/242* (2019.01)

(52) U.S. Cl.
CPC .... *G06F 16/24547* (2019.01); *G06F 16/2365* (2019.01); *G06F 16/242* (2019.01)

(58) Field of Classification Search
CPC .... G06F 16/953; G06F 16/43; G06F 18/2413; G06F 18/22; G06F 16/3344; G06F 18/24147

(Continued)

(56) References Cited

U.S. PATENT DOCUMENTS 8,108,389 B2    1/2012  Bobick
8,346,792 B1 *  1/2013  Baker ................... G06F 16/242
                                               707/769

(Continued)

OTHER PUBLICATIONS

Bostic, et al. "A validation of the subjective vitality scale using structural equation modeling." Social indicators research 52.3 (2000): 313-324.

(Continued)

*Primary Examiner* — Tony Mahmoudi
*Assistant Examiner* — Linh Black
(74) *Attorney, Agent, or Firm* — Miller Johnson

(57) ABSTRACT

A query generation system includes memory hardware configured to store instructions and processor hardware configured to execute the instructions. The instructions include obtaining a definition of a query specifying a number of elements of the query. The instructions include identifying candidate query elements for the query that correspond to a set of multiple domains. The instructions include, based on the specified number, determining a target number for each of the domains. The instructions include optimizing a selection of query elements from among the candidates. Using data from prior queries, the optimization maximizes at least one of internal consistency of the selected query elements and correlation of the selected query elements with a reference query. The optimization selects the target number of query elements for the domains. The instructions include storing the selected query elements. The instructions include transmitting information identifying the selected query elements to a query execution system.

19 Claims, 14 Drawing Sheets

(58) Field of Classification Search
USPC ....... 707/708, 713, 718, 728, 763, 765, 769,
707/771, 748, E17.014, E17.015,
707/E17.016, E17.017, E17.061, E17.062,
707/E17.063, E17.074, E17.071
See application file for complete search history.

(56) References Cited

U.S. PATENT DOCUMENTS

| | | | | |
|---|---|---|---|---|
| 9,389,922 | B2 | 7/2016 | Bauer | |
| 9,454,599 | B2 | 9/2016 | Golden | |
| 9,665,628 | B1 * | 5/2017 | Dubey | G06N 99/00 |
| 9,690,972 | B1 * | 6/2017 | Chau | H04L 63/0861 |
| 10,171,497 | B2 | 1/2019 | Damian | |
| 10,191,999 | B2 | 1/2019 | Liu | |
| 10,558,662 | B2 | 2/2020 | Aldrich | |
| 10,581,701 | B2 | 3/2020 | Bauer | |
| 10,997,190 | B2 | 5/2021 | Porath | |
| 11,294,974 | B1 * | 4/2022 | Shukla | G06F 16/90335 |
| 2004/0030685 | A1 | 2/2004 | Helles | |
| 2006/0281987 | A1 * | 12/2006 | Bartesaghi | G06T 7/11 |
| | | | | 600/410 |
| 2008/0270190 | A1 | 10/2008 | Sato | |
| 2011/0258179 | A1 | 10/2011 | Weissman | |
| 2015/0112694 | A1 | 4/2015 | Blake | |
| 2015/0199359 | A1 | 7/2015 | Chilakamarri | |
| 2015/0356127 | A1 | 12/2015 | Pierre | |
| 2016/0086293 | A1 | 3/2016 | Sikchi | |
| 2017/0024483 | A1 | 1/2017 | Primke | |
| 2017/0124269 | A1 * | 5/2017 | McNair | G16H 50/20 |
| 2017/0235848 | A1 * | 8/2017 | Van Dusen | G06Q 10/101 |
| | | | | 705/12 |
| 2018/0005161 | A1 * | 1/2018 | Cong | G06Q 10/06398 |
| 2018/0101540 | A1 * | 4/2018 | Stoop | G06F 16/7867 |
| 2018/0336247 | A1 | 11/2018 | Ignatyev | |
| 2019/0311301 | A1 * | 10/2019 | Pyati | G06F 16/901 |
| 2020/0026772 | A1 * | 1/2020 | Wheeler | G06F 16/248 |
| 2021/0073291 | A1 * | 3/2021 | Hunter | G06F 16/1858 |
| 2021/0090694 | A1 * | 3/2021 | Colley | G16B 30/00 |
| 2021/0219893 | A1 | 7/2021 | Luz | |
| 2021/0295822 | A1 * | 9/2021 | Tomkins | G06F 16/3338 |
| 2021/0342490 | A1 * | 11/2021 | Briancon | G06F 21/14 |
| 2022/0093240 | A1 | 3/2022 | Gentry | |
| 2022/0114186 | A1 * | 4/2022 | Frazier | G06F 21/602 |
| 2022/0116415 | A1 * | 4/2022 | Burgis | H04L 67/51 |
| 2022/0253871 | A1 * | 8/2022 | Miller | G06F 16/36 |
| 2022/0319663 | A1 * | 10/2022 | Neumann | G16H 20/60 |
| 2023/0195733 | A1 * | 6/2023 | Tan | G06N 3/04 |
| | | | | 707/769 |
| 2023/0268042 | A1 | 8/2023 | Sebastian | |
| 2023/0343472 | A1 | 10/2023 | Mcgarvey | |
| 2023/0395204 | A1 | 12/2023 | Mitjans | |
| 2023/0395220 | A1 | 12/2023 | Vallery | |

OTHER PUBLICATIONS

Salama-Younes, Mareï, et al. "Factor structure and internal consistency of the 12-item General Health Questionnaire (GHQ-12) and the Subjective Vitality Scale (VS), and the relationship between them: a study from France." Health and Quality of life Outcomes 7.1 (2009): 1-6.
Ryan, et al., "On energy, personality, and health: Subjective vitality as a dynamic reflection of well-being." Journal of personality 65.3 (1997): 529-565.
Fini, et al. "Subjective vitality and its anticipating variables on students." Procedia-Social and Behavioral Sciences 5 (2010): 150-156.
Buchner, Laura, et al. "The modified German subjective vitality scale (SVS-GM): Psychometric properties and application in daily life." Frontiers in Psychology 13 (Jul. 29, 2022): 948906.

* cited by examiner

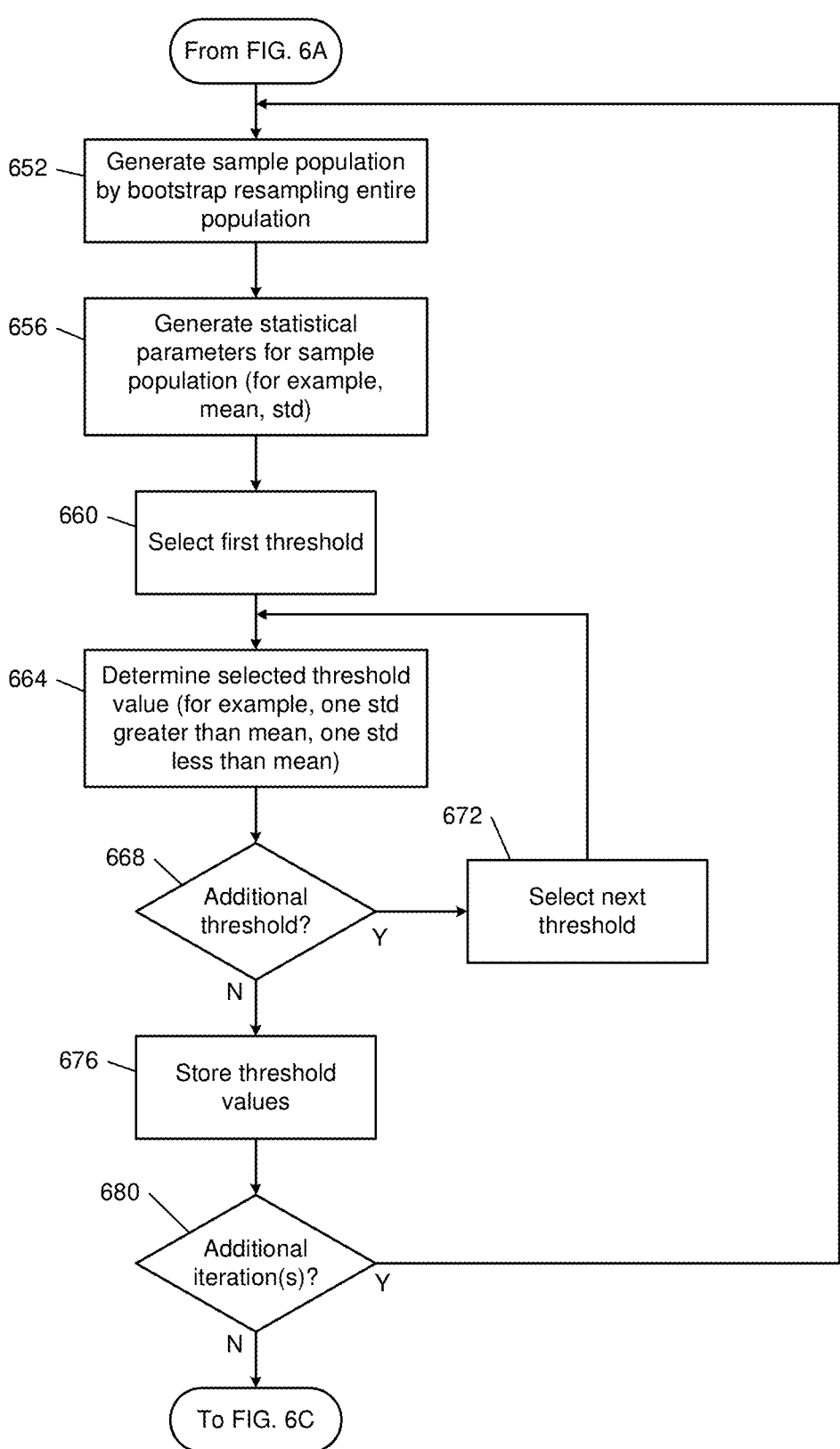

652 — Generate sample population by bootstrap resampling entire population

656 — Generate statistical parameters for sample population (for example, mean, std)

660 — Select first threshold

664 — Determine selected threshold value (for example, one std greater than mean, one std less than mean)

668 — Additional threshold?

672 — Select next threshold

Y

N

676 — Store threshold values

680 — Additional iteration(s)?

From FIG. 6A

FIG. 6B

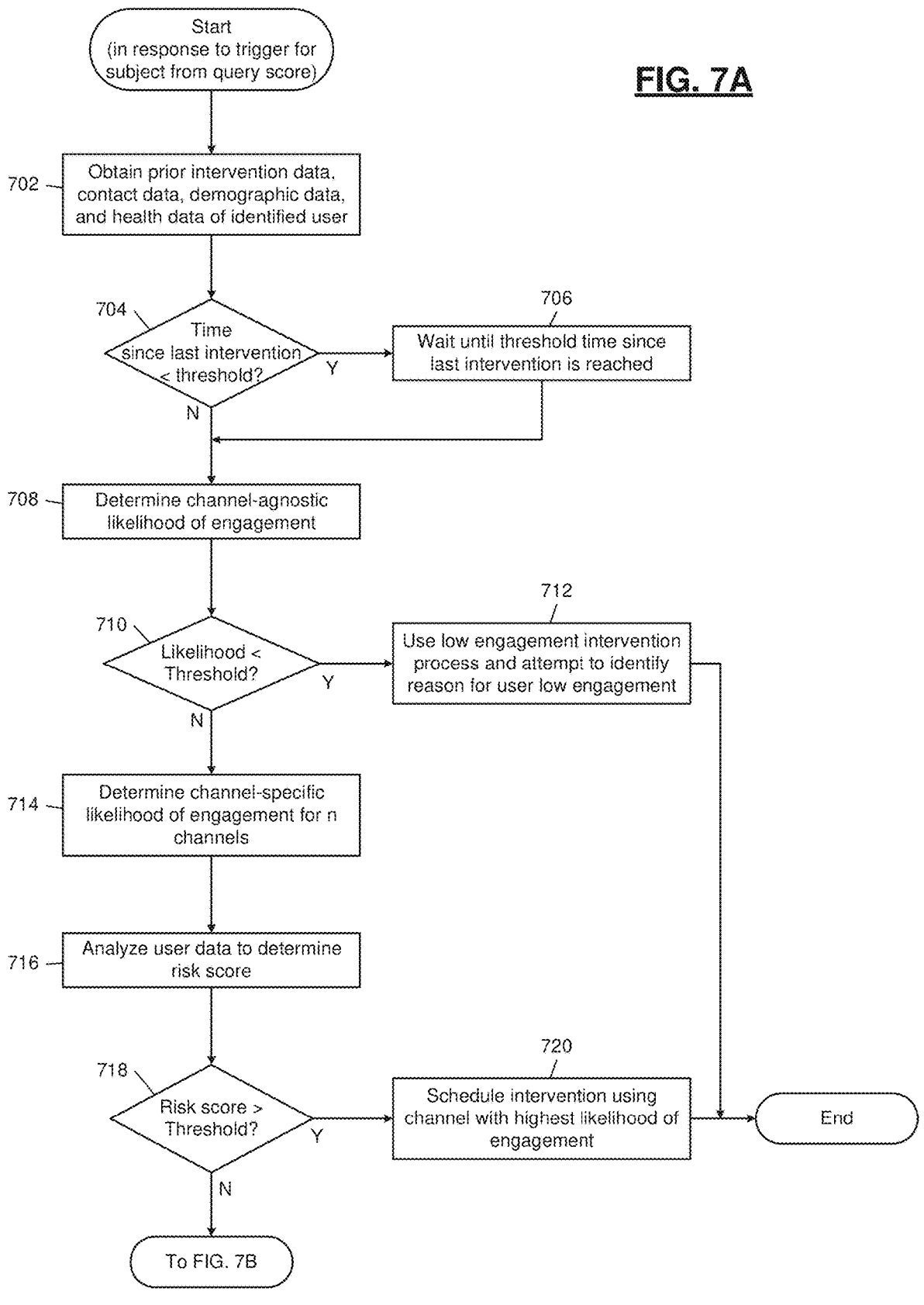

FIG. 7A

Start
(in response to trigger for subject from query score)

702 — Obtain prior intervention data, contact data, demographic data, and health data of identified user 704 — Time since last intervention < threshold?

706 — Wait until threshold time since last intervention is reached

708 — Determine channel-agnostic likelihood of engagement

710 — Likelihood < Threshold?

712 — Use low engagement intervention process and attempt to identify reason for user low engagement 714 — Determine channel-specific likelihood of engagement for n channels 716 — Analyze user data to determine risk score 718 — Risk score > Threshold?

720 — Schedule intervention using channel with highest likelihood of engagement

End

To FIG. 7B

GENETIC-ALGORITHM-ASSISTED QUERY GENERATION

CROSS-REFERENCE TO RELATED APPLICATIONS

This application claims the benefit of U.S. Provisional Application No. 63/419,562 filed Oct. 26, 2022, the entire disclosure of which is incorporated by reference.

FIELD

The present disclosure relates to programmatic query building and execution and more particularly to building queries using genetic algorithms.

SUMMARY

A query generation system includes memory hardware configured to store instructions and processor hardware configured to execute the instructions from the memory hardware. The instructions include obtaining a definition of a query. The definition specifies a number of elements of the query. The instructions include identifying candidate query elements for the query. The candidate query elements correspond to a set of multiple domains. The instructions include, based on the specified number, determining a target number of query elements for each of the domains. The instructions include optimizing a selection of query elements from among the candidate query elements for the domains. The optimization is targeted to maximize at least one of internal consistency of the selected query elements and correlation of the selected query elements with a reference query. The optimization accesses data from prior queries to calculate the at least one of the internal consistency and correlation. The optimization selects the target number of query elements for the domains. The instructions include storing the selected query elements. The instructions include transmitting information identifying the selected query elements to a query execution system.

In other features, the optimizing is performed using a genetic algorithm. In other features, the internal consistency is assessed based on Cronbach's alpha. In other features, the correlation is based on a Pearson correlation coefficient. In other features, the reference query includes a number of elements that is larger than the specified number.

In other features, the instructions include determining weights for each of the domains; and transmitting information specifying the weights to the query execution system to allow query results to be weighted in determining a query score. In other features, the weights are determined based on regression coefficients for the selected query elements.

In other features, the identifying candidate query elements includes performing principal component analysis (PCA) on the candidate query elements to determine correspondence with the domains. In other features, a first domain of the domains includes multiple subscales. Candidate query elements corresponding to the first domain respectively correspond to the multiple subscales. In other features, the instructions include performing exploratory factor analysis (EFA) to determine which of the multiple subscales the candidate query elements correspond to. In other features, the instructions include performing factor analysis (FA) to determine a number of the multiple subscales for the first domain.

In other features, values provided for the selected elements of the query are aggregated into a score for the query.

The instructions include determining clusters for the score. In other features, determining clusters for the score includes transforming the score from a first scale to a second scale. The second scale is numeric. In other features, the first scale is numeric and covers a first range of numbers, the second scale covers a second range of numbers, and the first range and the second range are not coextensive.

In other features, determining clusters for the score includes determining numeric thresholds separating the clusters. In other features, a first threshold of the numeric thresholds is determined based on a mean, over multiple iterations using different samples, of a linear combination of a mean of previous query scores and a standard deviation of the previous query scores. In other features, the multiple iterations are performed using bootstrap resampling of a population of previous query scores.

In other features, the candidate query elements are string literals. In other features, each of the candidate query elements corresponds to one of the domains. A query system includes the query generation system and the query execution system. The query execution system is configured to present the selected elements of the query to a subject, obtain an input for each of the selected elements, and determine a score for the query based on the inputs for the selected elements.

In other features, a method according to the principles of the present disclosure includes steps corresponding to some or all of the above instructions. In other features, a non-transitory computer-readable medium stores some or all of the above instructions.

A system includes memory hardware configured to store instructions and a data store. The system includes processor hardware configured to execute the instructions. The instructions include, in response to designation of an entity within a data store, obtaining information corresponding to the designated entity from the data store and determining a condition of the designated entity based on the obtained information. The instructions include, based on the condition of the designated entity, identifying a set of states and selecting a state from the set of states. The instructions include obtaining a set of trigger conditions for the selected state. Each trigger condition of the set of trigger conditions specifies a set of satisfaction criteria. The instructions include, for each trigger condition of the set of trigger conditions, determining whether the trigger condition is satisfied by evaluating the satisfaction criteria of the trigger condition based on data corresponding to the designated entity. The instructions include selectively selecting another state from the set of states based on whether the trigger conditions of the set of trigger conditions are satisfied. The instructions include determining an executable sequence based on the selected state. The instructions include scheduling the executable sequence for execution.

In other features, the selecting another state is performed in response to none one of the set of trigger conditions being satisfied. In other features, the selecting another state is performed in response to at least one of the set of trigger conditions failing to be satisfied. In other features, the selecting another state is performed in response to a defined profile of the set of trigger conditions failing to be satisfied. In other features, verification is selectively specified for a trigger condition of the set of trigger conditions. In response to verification being specified for the trigger condition, the trigger condition is determined to be satisfied only in response to successful verification of the satisfaction criteria of the trigger condition.

In other features, the successful verification requires that the satisfaction criteria of the trigger condition be satisfied multiple times. In other features, the successful verification requires that the satisfaction criteria of the trigger condition be satisfied multiple times in greater than a specified time window. In other features, the specified time window is 24 hours (e.g., a day). In other features, the executable sequence selectively includes transmitting a message soliciting data acquisition to a person corresponding to the designated entity. In other features, the transmitting specifies a communications channel selected from a plurality of specified communication channels.

In other features, the transmitting includes transmitting a message to the person via a data acquisition device located at a residence of the person. In other features, the determining the executable sequence includes at least one of selecting the executable sequence from a data structure storing a plurality of executable sequences; or generating the executable sequence. In other features, the generating the executable sequence includes incorporating sequence elements based on input from a clinician user interface. In other features, the executable sequence selectively includes scheduling a point-to-point communication with a person corresponding to the designated entity.

In other features, the data corresponding to the designated entity is based on electronic health records. In other features, the data store includes a relational database. In other features, each state of the set of states is associated with a priority; the selecting initially selects a highest priority one of the set of states. In other features, the states include an escalation state, an intervention state, and a normal state. A priority of the escalation state is higher than a priority of the intervention state. The priority of the intervention state is higher than a priority of the normal state.

A computerized method includes presenting elements of a query to a subject, obtaining an input value for each of the elements from the subject, and aggregating the input values provided for the elements into a query score. The method includes identifying a selected cluster from a plurality of clusters based on the query score. The method includes determining an executable sequence based on the cluster for the query. The method includes scheduling the executable sequence for execution.

In other features, the query score is determined by transforming the input values into a vector in a multidimensional vector space. In other features, the method includes identifying the selected cluster is based on a minimum respective Euclidean distance between the query score and the plurality of clusters. In other features, the executable sequence selectively includes transmitting a message soliciting data acquisition to the subject. In other features, the transmitting specifies a communications channel selected from a plurality of specified communication channels.

In other features, the transmitting includes transmitting the message to the subject via a data acquisition device located at a residence of the subject. In other features, the determining the executable sequence includes at least one of selecting the executable sequence from a data structure storing a plurality of executable sequences; or generating the executable sequence.

In other features, the generating the executable sequence includes incorporating sequence elements based on input from a clinician user interface. In other features, the executable sequence selectively includes scheduling a point-to-point communication with the subject. A query execution system includes memory hardware configured to store instructions, and processor hardware configured to execute the instructions from the memory hardware. The instructions embody one or more of the above methods. A non-transitory computer-readable medium includes instructions that embody one or more of the above methods.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 6A, 6B, and 6C together form a flowchart of example operation in determining clusters according to the principles of the present disclosure.

FIGS. 7A and 7B together form a flowchart showing example channel-specific intervention determination for a specified user.

In the drawings, reference numbers may be reused to identify similar and/or identical elements.

DETAILED DESCRIPTION

Block Diagrams

Figure 1:
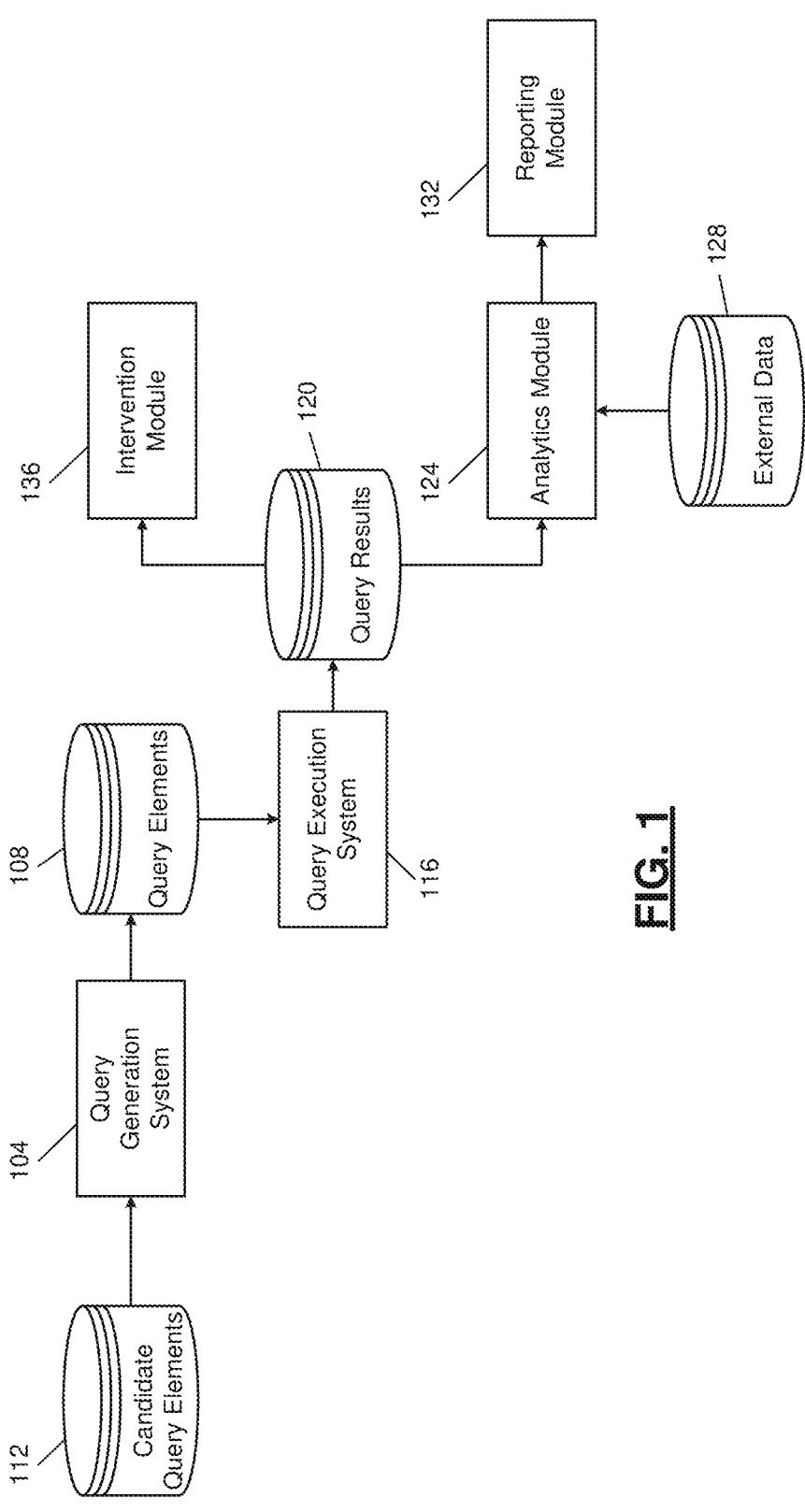
FIG. 1 is a functional block diagram of an example environment for query generation and execution.

FIG. 1 is a functional block diagram of an example environment for query generation and execution. A query generation system 104 determines a set of query elements in order to define a query. The set of elements for a particular query are stored as query elements 108. The query elements for a query may be selected from a set of candidate query elements 112. The query elements 108 represents data for the elements of one or more queries. In various implementations, some of the queries may have been specified by another mechanism than the query generation system 104. In various implementations, the query elements 108 and the candidate query elements 112 may be retained by one or more data stores. A data store may be implemented using a relational database, a column store, a linked list, a comma separated value (CSV) file, etc.

A query execution system 116 is configured to execute a query including the query elements specified in the query elements 108. Executing the query includes obtaining answers for each of the elements of the query with respect to a specific subject and determining an aggregate score for that subject from the answers. Results from the executed query are stored in a data store, represented graphically as query results 120.

An analytics module 124 processes the query results 120, such as by determining query scores across various subpopulations and, in some implementations, across periods of time. The analytics module 124 may also incorporate external data 128 into the analytics. For example, the external data 128 may include data about subjects of a query. For example, data about the subjects may include healthcare services usage, prescription drug usage, adherence (that is, the extent to which a subject follows a prescribed or indicated medical or drug regimen), health outcomes, and/or job performance. For example only, job performance may include measures such as sick time and productivity. As one example, the analytics module 124 may determine correlations between overall query scores and/or query element scores and components of the external data 128.

A reporting module 132 can be accessed by first or third parties to review query results for populations, subpopulations, and/or individuals. Different access controls may be imposed at different levels of granularity. For example only, licensed clinicians—through computing devices—may be permitted to view query results specific to a single subject, e.g., on a display. Further, access to subpopulations having fewer than a threshold number of subjects may be restricted. This is because subpopulations with a low number of subjects may carry a risk of deanonymization. As an example only, the threshold number of subjects may be 20.

An intervention module 136 may be implemented to monitor the query results 120 and schedule one or more interventions based on certain triggering events. A triggering event may be an overall query score falling below a threshold, an overall query result falling within a particular query cluster (such as the lowest cluster), or an individual query element score satisfying a condition, such as being less than a threshold.

Figure 2:
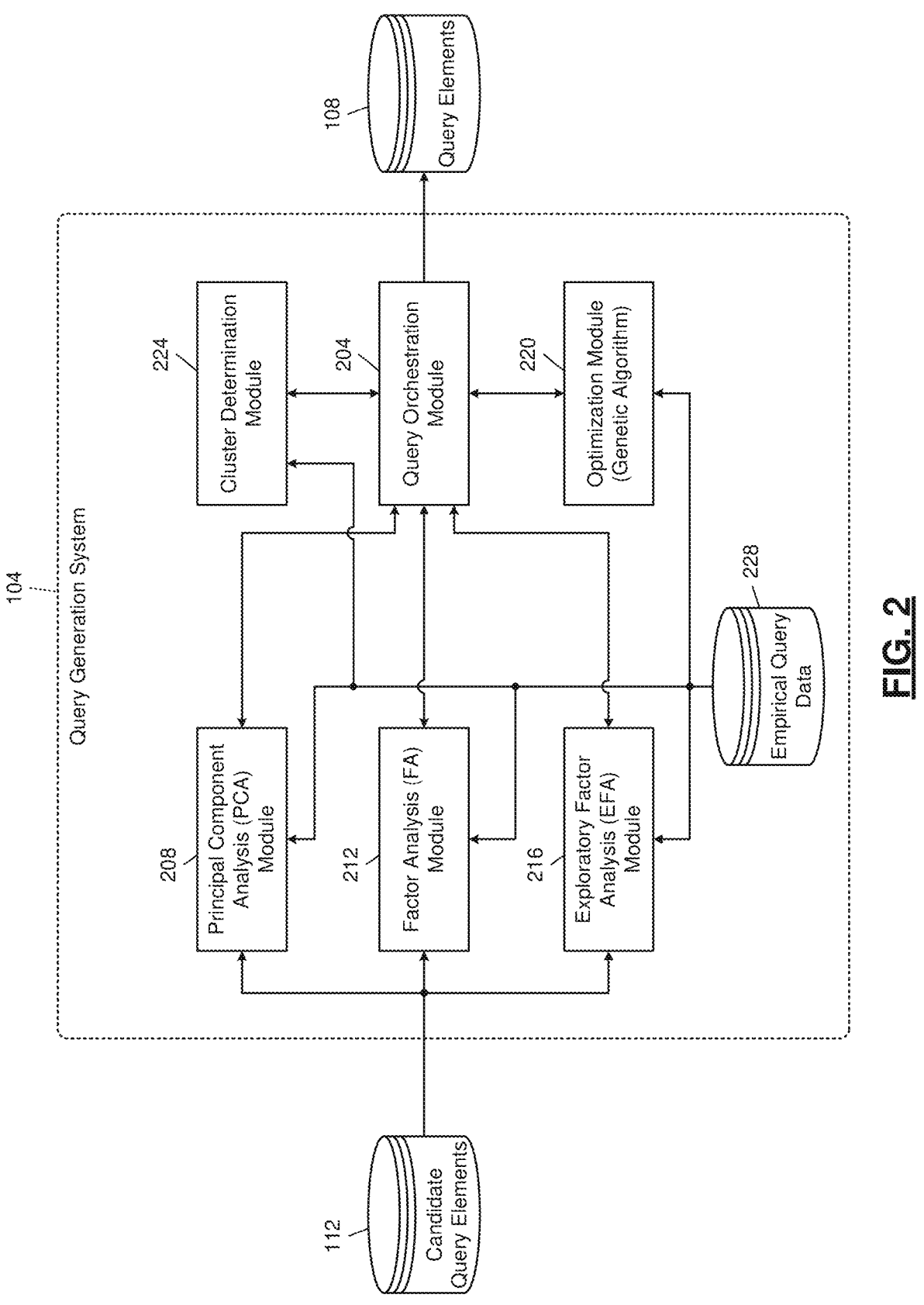
FIG. 2 is a functional block diagram of an example implementation of the query generation system.

In FIG. 2, a functional block diagram of an example implementation of the query generation system 104 is presented. The query orchestration module 204 controls generation of a query. For example, the query may encompass multiple domains. Within each domain, there may be one or more subscales. For each domain, one or more query elements are identified for the query.

The query orchestration module 204 may control a principal component analysis (PCA) module 208 to determine whether certain elements correspond to a particular domain. For example, the PCA module 208 may confirm that elements within a domain share a principal component with that domain.

The query orchestration module 204 may also control a factor analysis (FA) module 212 to evaluate query elements. In various implementations, the PCA module 208 and the FA module 212 may operate in parallel. The two methods may be similar with certain conceptual differences. For example, the PCA module 208 may indicate a conceptual factor that all of the elements are designed to indicate, where the component is the corresponding domain. Meanwhile, the FA module 212 may be tuned to overarching latent variables that explain how elements capture certain subscales.

The query orchestration module 204 may also control an exploratory factor analysis (EFA) module 216, which reviews the connection between elements and each subscale of a domain. In various implementations, a confirmatory factor analysis (CFA) may be used when elements are not cross-loaded—that is, the CFA may be more appropriate when the elements are uncorrelated.

The query orchestration module 204 may determine various features of merit for a set of query elements in a query. For example, one feature of merit may be Cronbach's alpha coefficient. Another feature may be Guttman's Lambda 6. The query orchestration module 204 may rely on an optimization module 220 to select from the candidate query elements to determine the query elements for a query. The optimization module 220 may execute a genetic algorithm (GA), such as from the GA package of the R programming language.

A cluster determination module 224 may be used by the query orchestration module 204 to determine clusters into which query scores will fall. For example, each query, when executed for a subject, may result in a score for that subject. The cluster determination module 224 may determine clusters of scores such that each score can be assigned to a single cluster. As one example of clusters, a trio of low, medium, and high clusters may be determined by the cluster determination module 224.

Selected query elements for a query are stored into the query elements 108 by the query orchestration module 204. Some or all of the components of the query generation system 104 may rely on empirical query data 228, which may include data for some or all of the candidate query elements 112 when those query elements were included in previously executed queries.

Figure 3:
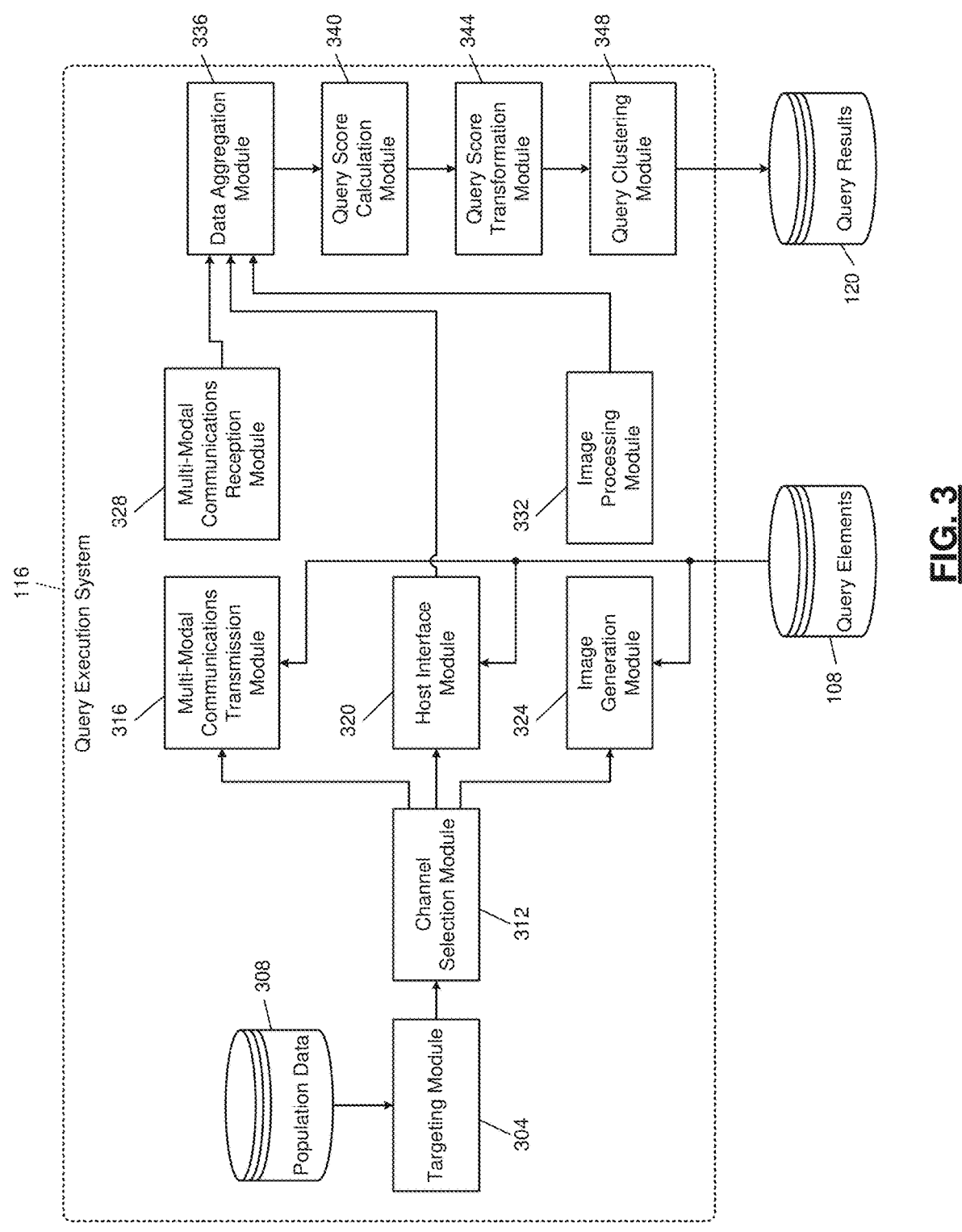
FIG. 3 is a functional block diagram of an example implementation of the query execution system.

In FIG. 3, an example implementation of the query execution system 116 is shown. In order to execute a query, a targeting module 304 may select subjects for the query from a population data store 308. For example, subjects may be selected based on demographic data, medical diagnoses, etc.

A channel selection module 312 may select, for each subject, how the query should be executed. For example, the channel selection module 312 may delegate a query for a particular subject to one or more of a multi-modal communications transmission module 316, a host interface module 320, and an image generation module 324. In various implementations, different queries may be selected depending on the channel—for example, a query with fewer elements may be used with a channel having limited information carrying capability, such as text messaging.

The multi-modal communications transmission module 316 may use text messages, robotic calls, emails, human phone calls, faxes, postcards, and printed mailings to reach a subject. A multi-modal communications reception module 328 receives inputs from the subject for the query. For example, these inputs may be received via text message, email, voicemail, interactive voice recognition, etc.

The host interface module 320 may interface with a hosting service, such as a web-hosting service. The subject of the query may then interact with the host interface module 320 via the web-hosting service to provide data responsive to some or all elements of the query using a browser or app-based interaction with the web host.

The image generation module 324 may generate an image representing some or all elements of the query for presentation to a user. For example, this image may be displayed on a screen, printed on paper, etc. An image processing module 332 may receive query results from a subject, such as by using optical character recognition, interpreting bubble sheet forms, etc.

A data aggregation module 336 gathers query results from some or all of the multi-modal communications reception module 328, the host interface module 320, and the image processing module 332. Based on the aggregated data, a query score calculation module 340 is configured to determine a score for each subject of the query. In various implementations, the score may be calculated independently for each subject—that is, the score of one subject is not dependent on the scores of any of the other subjects.

In various implementations, a query score transformation module 344 transforms the score from the query score calculation module 340 into another domain. For example, the query score transformation module 344 may change from one scale (such as a linear scale covering integer from 1 and 7 inclusive) to another scale (such as a scale covering rational numbers from 0 to 100 inclusive, a scale of integers from 0 to 100 inclusive, a logarithmic scale, etc.).

Figure 4:
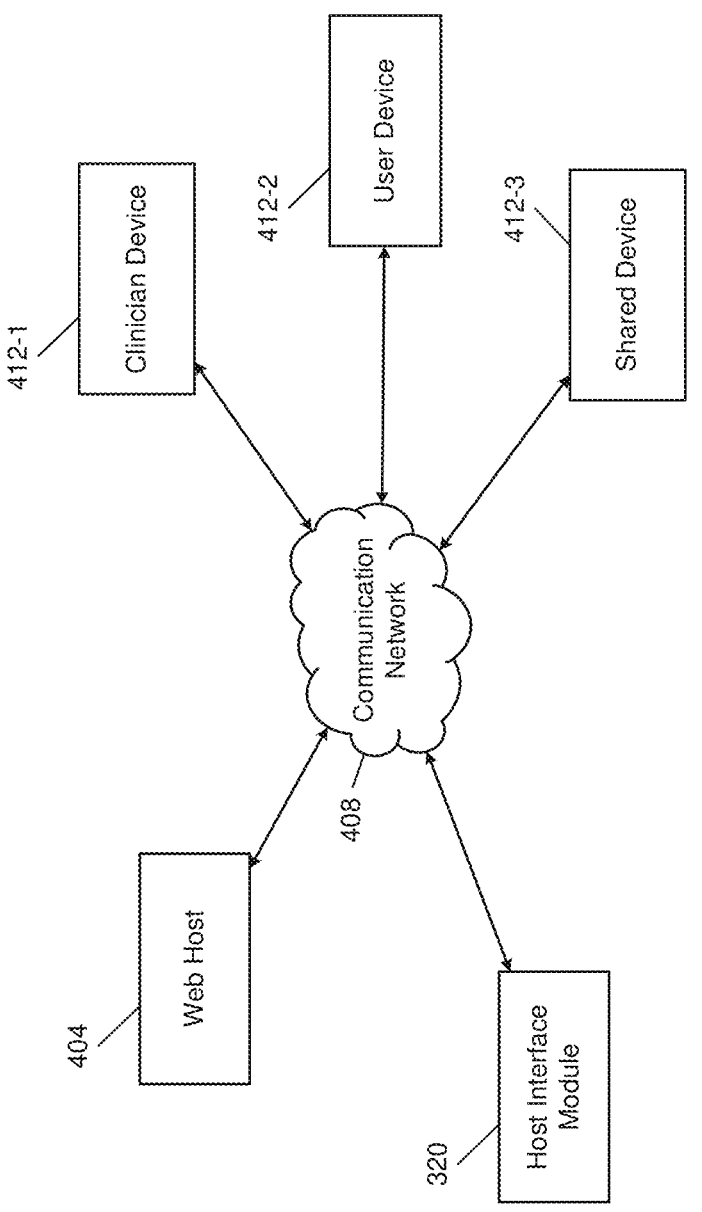
FIG. 4 is a functional block diagram of a host interface module in an example networked environment.

In FIG. 4, the host interface module 320 is shown in an example networked environment. The host interface module 320 communicates with a web host 404 via a communications network 408, which may include one or more private networks and one or more public networks, such as the Internet. The web host 404 may provide an HTTP interface to a clinician device 412-1, a user device 412-2, and a shared device 412-3, collectively referred to as endpoint devices 412. The endpoint devices may be used to display prompts related to the elements of a query to a subject as well as to receive inputs for the query elements. The endpoint devices 412 may access a web page provided by the web host 404 and/or may have built in interfaces that simply post data to the web host 404.

As examples, the clinician device 412-1 might be used by a clinician, such as a doctor, nurse, pharmacist, etc., to provide answers for a subject based on in-person or remote interaction with the subject. The user device 412-2 may be used by the subject to provide query responses and may include a device owned by the subject, such as a smartphone, laptop, tablet, etc. The shared device 412-3 might be, for example, a kiosk at a clinician's office. In other instances, the shared device 412-3 may be used by a clinician for their work and put into a restricted mode for use by the subject in entering responses to the query elements.

Clustering

Returning to FIG. 3, a query clustering module 348 may assign each score to a particular cluster. One or both of the transformed score and the assigned cluster may be stored in the query results 120. As an example, three clusters may be defined for low, medium, and high scores; threshold scores may define the boundaries between the clusters. In various implementations, the threshold scores are chosen a priori based on expert analysis and an initial training period. The threshold scores may be updated over time. In some implementations, the threshold scores may be determined and/or updated automatically. For example, the threshold scores may be set in order to achieve a specified relative size of the clusters—for example, the threshold scores may be adjusted over time to achieve a distribution approximating 30% of scores in the first cluster, 40% of scores in the second cluster, and 30% of scores in the third cluster. The specified relative sizes may be set by an expert and may be updated over time according to goals of an operator. For example, when a certain cluster is associated with more expensive interventions, the relative size of that cluster may be made smaller to control expenses.

In various implementations, the query clustering module 348 includes an artificial intelligence clustering system that uses, for example, k-means clustering to determine clusters. The artificial intelligence clustering system may revise the boundaries of the clusters over time and may even increase or decrease the number of clusters. In various implementations, the maximum and minimum number of clusters may be specified a priori as metaparameters for the artificial intelligence clustering system.

In various implementations, the score output by the query score transformation module 344 may be a vector rather than a single value. In such implementations, the query score calculation module 340 may determine multiple scores for a query—for example, an individual score may be calculated for each section of the query. The query score transformation module 344 may use a vectorization algorithm to transform these individual scores into a vector. In various implementations, each individual score is mapped to an element of the vector. For a query with 8 sections (as simply one numeric example among many), the score vector may have 9 elements, one for each of the 8 sections and another element that corresponds to something else, such as an overall score. In various implementations, the vector may include elements not derived from the query, but instead from another resource storing data about the subject of the query.

When the score from the query score transformation module 344 is a vector, the query clustering module 348 may cluster the vectors into a set of clusters. Similarity of two vectors may be measured by Euclidean distance between the vectors. As with single-value scores, the number and size of clusters may be specified a priori and may be updated. In other implementations, the artificial intelligence clustering system may determine the number of clusters organically based on patterns in the score vectors.

Flowcharts

Figure 5A:
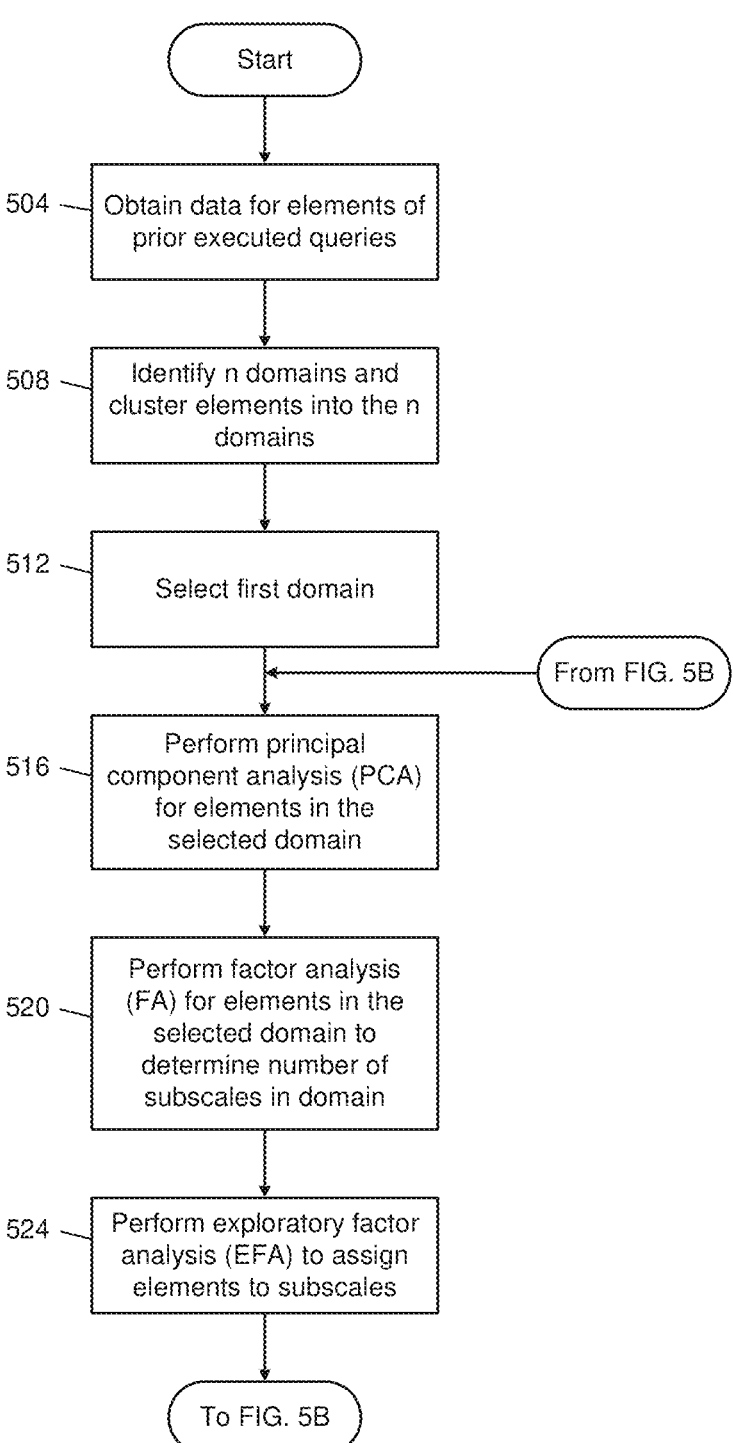
FIGS. 5A and 5B together form a flowchart demonstrating example operation of query generation according to the principles of the present disclosure.
Figure 5B:
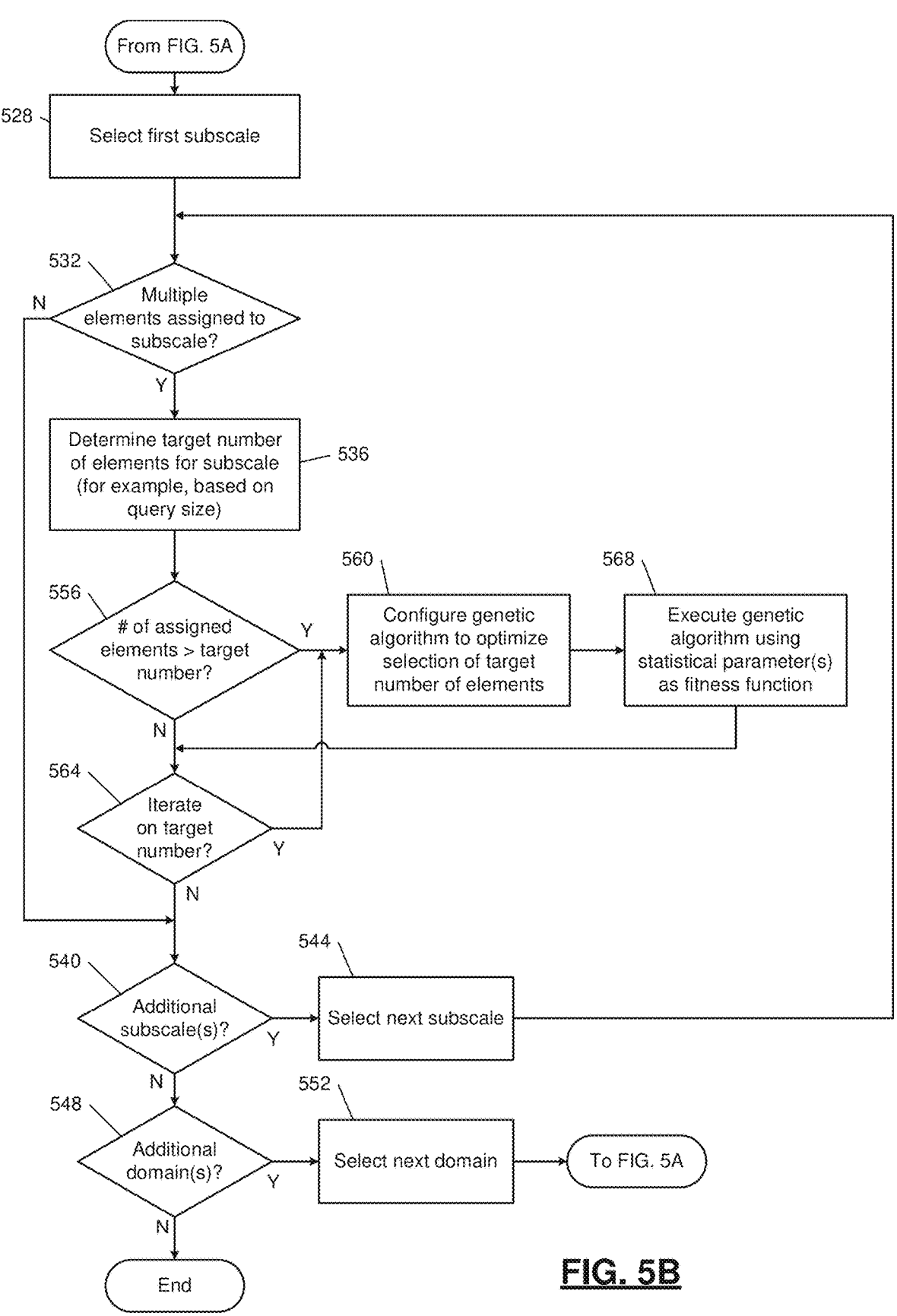

FIGS. 5A and 5B together form a flowchart demonstrating example operation of query generation according to the principles of the present disclosure. Control begins at 504 by obtaining data for elements of prior executed queries. At 508, control identifies n domains and clusters elements into the n domains. In this case "n" is an integer greater than or equal to one. When n is equal to one, the elements may all be clustered into the same domain or—in some instances—a subset of elements is clustered into the domain and a subset of elements is excluded from consideration. In various implementations, the value of n is based on supervised learning. For example, a subject matter expert may specify the value of n based on research into the number of relevant domains for a query. At 512, control selects the first domain and continues at 516.

At 516, control performs principal component analysis (PCA) for elements in the selected domain. The selected domain is used as the factor for PCA, which therefore determines whether the elements actually belong to the selected domain. If not, elements that appear to align with a different domain may be excluded from the selected domain.

At 520, control performs factor analysis (FA) for elements in the selected domain to determine a number of subscales within the domain. In various implementations, the number of subscales is an integer greater than or equal to one. The number of subscales may be set initially through supervised learning, such as by a subject matter expert who is able to specify particular subscales within the domain. In various implementations, the set of subscales is the same for each domain; in other implementations, the set of subscales may vary by domain. At 524, control performs exploratory factor analysis (EFA) to assign elements to the subscales. The PCA, FA, and EFA is based on data from prior executed queries. Control continues at 528 in FIG. 5B.

At 528, control selects a first subscale from the selected domain. At 532, control determines whether multiple elements are assigned to that subscale. If so, control transfers to 536; otherwise, control transfers to 540. At 540, control determines whether one or more additional subscales remain. If so, control transfers to 544; otherwise, control continues at 548. At 544, control selects the next subscale and returns to 532. At 548, control determines whether there are one or more additional domains. If so, control transfers to 552; otherwise, control ends, having selected query elements for the desired query. At 552, control selects the next domain and returns to 516 of FIG. 5A.

At 536, control determines a target number of elements for the sub scale. For example, this target number may be based on a specified query size. For example, if there are eight domains with three subscales each and a desired total number of elements of 48, the target number of elements per subscale per domain may be two elements. In various implementations, the number of target elements may vary based on the particular subscale. Further, the number of elements in each domain may differ. For example, a robust query may require more elements in one domain than in another.

At 556, control determines whether the number of elements assigned to the subscale is greater than the target number. If so, control transfers to 560; otherwise, control transfers to 564. At 560, control configures a genetic algorithm to optimize the elements selected to reach the target number. For example, from a set of candidate elements, a genetic algorithm may select two at a time.

Although shown in this particular example as being performed at the subscale level, the genetic algorithm may be run at the domain level. Further, in various implementations, the genetic algorithm may be run at the query level—in other words, the genetic algorithm may select elements for each subscale across multiple or all domains as part of the same genetic algorithm run.

Continuing with the present example, at 568, control executes the genetic algorithm using one or more statistical parameters as the fitness function. The statistical parameters may include an internal consistency measure and/or a correlation measure. For example, the internal consistency measure may include Cronbach's alpha. For example, the correlation measure may be a Pearson correlation coefficient between (i) results of prior queries using the current iteration of query elements and (ii) a reference standard. The reference standard may be a complete set of the candidate query elements or a superset of the selected query elements. In other words, the genetic algorithm of 568 may determine which elements should be selected in a proper subset of the candidate elements to best approximate a query using more of the candidate elements.

Control then continues at 564. At 564, control determines whether to iterate on the target number. For example, control may iterate on the target number to see if further reducing the number of elements still achieves a reasonable statistical parameter. If fewer query elements are needed to achieve the same statistical parameters, the query with fewer elements may be preferable in some instances. If iteration on the target number is desired, the target number may be adjusted and control continues at 560; otherwise, once iteration on the target number has completed, control continues at 540.

Figure 6A:
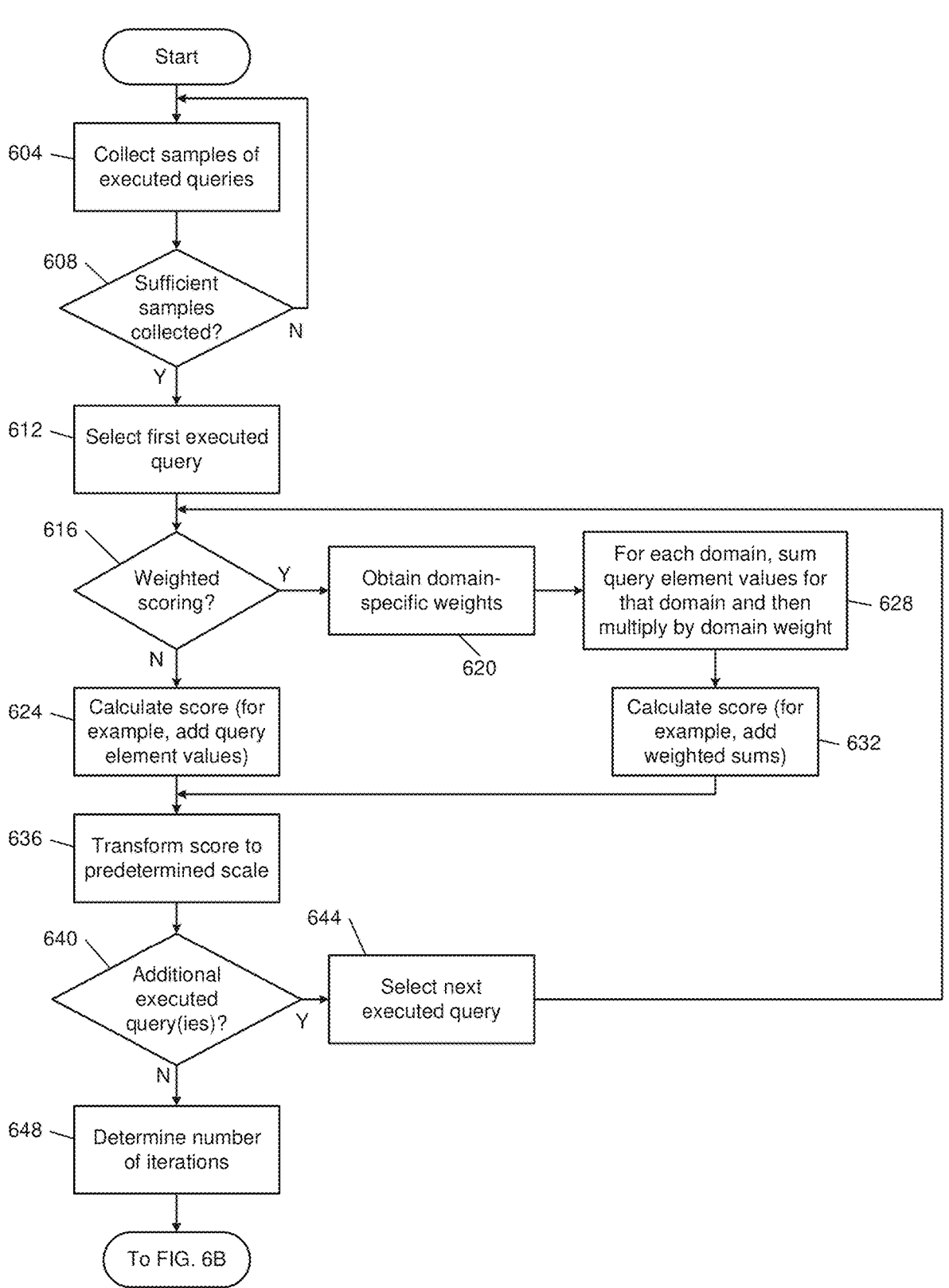
Figure 6C:
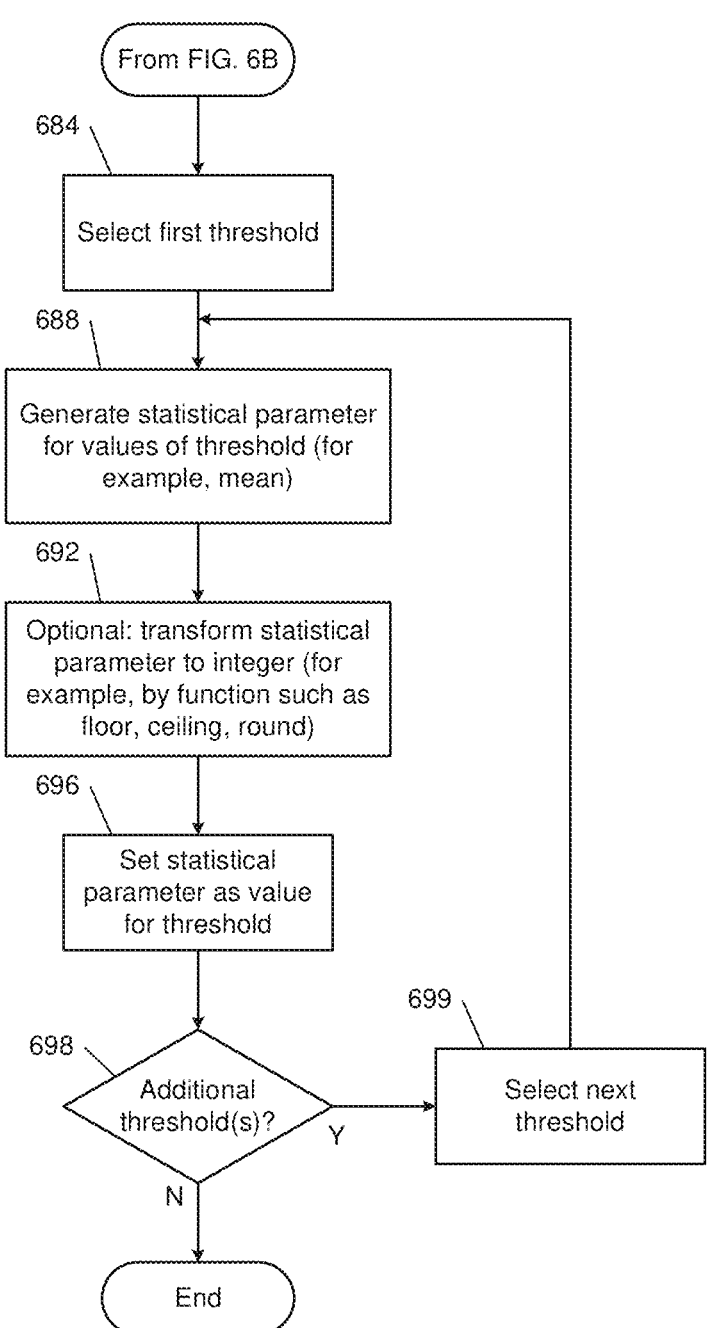

FIGS. 6A, 6B, and 6C together form a flowchart of example operation in determining clusters according to the principles of the present disclosure. At 604, control collects samples of executed queries. At 608, control determines whether sufficient samples have been collected. If so, control transfers to 612; otherwise, control returns to 604.

At 612, control selects the first executed query from the samples. At 616, control determines whether weighted scoring is used for the selected query. If so, control transfers to 620; otherwise, control transfers to 624. Weighted scoring may be used for some queries but not for others. For example, weights may be determined based on regression coefficients and weighted scores may be compared to unweighted scores. If a statistically significant benefit is obtained from weighted scores, weighted scores may be used for that type of query.

At 620, control obtains domain specific weights for the query. In other words, specific weights may be assigned to each domain. In various implementations, weights may also be assigned to subscales but in the example shown here, the weights are the same across subscales for a particular domain. At 628, control sums the query element values for a particular domain and multiplies that sum by the domain weight. Control repeats this for each domain. At 632, control determines the query score, such as by adding together the weighted sums. In various implementations, control may then divide by the number of domains. Control then continues at 636.

At 624, control determines the score, such as by adding together the query element values. In various implementations, control may then divide by the number of domains. In various implementations, control may average together element values for a subscale and then average together the subscale values to determine a value for the domain. Control then continues at 636.

At 636, control transforms the score to a predetermined scale, such as a scale from 0 to 100. For example, the transformation from score to scaled score may be performed using the following equation:

$$\text{Scaled} = ((\text{Score}_i - \text{MIN}(\text{Score})) / (\text{MAX}(\text{Score}) - \text{MIN}(\text{Score}))) \times 100$$

At 640, control determines whether there is an additional executed query to process. If so, control transfers to 644; otherwise, control transfers to 648. At 644, control selects the next executed query and returns to 616. At 648, control determines a number of iterations for cluster determination. As one numeric example, a set of 10,000 samples may be collected at 604 and 1,000 iterations may be performed. Control continues at 652 in FIG. 6B.

At 652, control generates a sample population by bootstrap resampling the entire population of samples. Bootstrap resampling means sampling with replacement such that previously selected samples may be selected again in subsequent iterations. Control continues at 656, where control generates statistical parameters for the sample population. For example, the mean of query scores, the standardization of query scores, the variance of query scores, etc. may be calculated.

At 660, control selects a first threshold. At 664, control determines a selected value for the threshold. For example, a first threshold may be determined as one standard deviation greater than the mean while another threshold may be determined as one standard deviation less than the mean. At 668, control determines whether there are additional thresholds to be determined. If so, control transfers to 672; otherwise, control transfers to 676. At 672, control selects the next threshold and returns to 664. At 676, control stores the determined values for the thresholds. At 680, control determines whether another iteration is to be performed. If so, control returns to 652; otherwise, control transfers to 684 of FIG. 6C.

At 684, control selects the first threshold. At 688, control generates a statistical parameter for values of that threshold. For example, control may calculate a mean of the values for that threshold across all of the iterations. At 692, control may transform the statistical parameter to an integer or other set of values. For example, transforming to an integer may be performed by using a function such as floor, ceiling, or round. At 696, control sets the statistical parameter as the value for the threshold for this query.

At 698, control determines whether there are additional thresholds. If so, control transfers to 699; otherwise, control ends. At 699, control selects the next threshold and returns to 688. In this way, thresholds between the various clusters are determined. For example, in order to divide a range into three clusters, a first threshold and a second, higher threshold may be determined. The resulting clusters may be referred to as low, medium, and high.

The present methods described herein—e.g., with respect to FIGS. 5-7—can be executed using the modules described herein and/or using the systems of FIGS. 1-4. The modules can include the memory to store the instructions, query data, query data, derived data, and resultant data, and one or more processors to produce the queries, output queries, receive the query responses, process the data, and communicate the data.

Intervention

The present disclosure describes how an operator can use an intervention system to identify subjects for whom interventions would be beneficial and to select the appropriate interventions for specific subjects. Interventions may be warranted when it appears that negative consequences may arise from a low query score. For example, if the query score is reflective of a low vitality, the subject may exhaust their supply of prescription medication prior to obtaining a refill of the prescription, resulting in potentially adverse medical consequences. For example, if the query score is reflective of a low vitality, the subject may require a medical intervention or a behavioral health intervention.

Interventions may take the form of an operator (such as a health insurer, pharmacy benefit manager, or employer) contacting the subject. For example, an operator may directly contact the subject or request that a local pharmacy, medical provider, or caregiver contact the subject. These contacts may take the form of personal visits, telephone calls, text messages, mobile alerts, emails, postal letters, etc. Communications with the subject may include reminders about their course of treatment, including expected dates by which existing medication will be exhausted, expired, or otherwise need refilling.

The communications may also include warnings about the potential effects of a gap in care or other adverse effect of a low vitality. The communications may provide incentives for the subject to avoid a gap in care, such as transportation to medical facilities, discounts on prescriptions, and shipping discounts for prescription drugs or other medical supplies. In addition, the communications may assist the subject in setting up automatic refills and other technological approaches to increasing adherence to prescribed treatment regimens. Another technological approach to increase adherence is establishing mail-order prescriptions, which may reduce the time and transportation barriers to obtaining new and refill prescriptions from a retail pharmacy.

In addition to choosing between these types of interventions, specifics about the interventions may be determined. For example, a time of day at which to make the intervention may be specified. In addition, when multiple contact methods are available, the type of contact (such as work email, home phone, etc.) may be selected along with the time of day and day of week for the intervention.

A system according to the present disclosure identifies which subjects are at risk and also how receptive the subjects will be to interventions. In this way, interventions can be targeted to have maximum impact. In some implementations, the cost or outcome associated with negative effects may be taken into account so that interventions can be directed to those subjects where low vitality has a more drastic negative outcome for the subject and/or may incur a higher cost in remediation due to that negative account.

As one example only, a two-by-two matrix may be used to select interventions. In this example, for a subject at high risk and a high likelihood of engagement with an intervention, the intervention system may place and/or schedule a real-time intervention (such as a phone call). Meanwhile, for a subject at high risk but a low likelihood of engagement with an intervention, the intervention system may mail a physical letter. For a subject with a lower risk, the intervention system may transmit a text message, regardless of whether their likelihood of engagement is high or low. In other words, in this particular example of potential business logic, two of the cells in this matrix are assigned the same intervention. Conceptually, the matrix could include a third row for a subject whose risk is low enough that the intervention system makes no intervention at all for that subject.

In other implementations, a single score may be determined based on two or more of (i) risk to subject of low query score, (ii) likelihood of engagement, and (iii) cost of adverse effects. The single score may increase based on increased risk, may increase based on increased likelihood of engagement, and may also increase based on increased cost of adverse effects. This cost may be approximated based on direct and indirect costs to the subject, to a particular entity (such as an employer or insurer), and/or to society (measured in terms of social services, economic productivity, etc.).

Once the single score is determined, ranges of the single score correspond to various interventions. In various implementations, values of the single score below a certain threshold (for example, indicating both a low risk of a gap in care as well as a low likelihood of engagement with interventions) may be assigned no intervention. Higher ranges of the single score may be assigned to higher-cost interventions (such as scheduling a human call, such as from a clinician or social worker).

A variety of models may be implemented to estimate risks to a subject. In various implementations, multiple models may be implemented and one or more models may be selected based on subject data. For example, a first model may estimate the risk of a subject experiencing a gap in care related to treatment for diabetes. A second model may estimate a risk of a gap in care for treatment related to hypertension. A third model may estimate a risk of a gap in care for treatment of high cholesterol. A fourth model may estimate a risk of a high figure of merit being measured (such as A1C for a diabetic). A fifth model may estimate a risk of a subject not obtaining a lab test for a particular condition (such as a blood test for ongoing diabetes management).

Meanwhile, a general intervention model may be implemented to determine the likelihood of a subject engaging with an executed intervention. The intervention model may be agnostic to the condition of the patient, meaning that the intervention model is applicable to patients having diabetes, hypertension, high cholesterol, housing insecurity, loneliness, etc.—or multiple of or none of these conditions. In addition, the intervention model may be agnostic to the type (or, channel) of engagement. In other words, the intervention model provides an estimate of the subject engaging with an intervention regardless of the form of the intervention (such as a phone call or an email).

In some implementations, additional specific models may be implemented. For example, models may be implemented that are specific to the condition of the subject. For example, a diabetes model may be implemented for diabetic subjects. Meanwhile, a hypertension model may be implemented for hypertensive subjects and a lipid model may be implemented for subjects with high cholesterol. Separately, a financial model may be implemented for subjects dealing with financial insecurity. A priority ranking system may select which model is applied to a subject that has multiple conditions. In other implementations, all applicable models may be applied to the subject and a single score calculated based on a weighted combination or a voting scheme.

In various implementations, channel-specific intervention models may be developed. These channel-specific intervention models may assess the likelihood that the subject will engage with, for example, a phone call versus an email. Some of these models may be restricted to specific subjects or to specific populations or groups of subjects. When multiple of the models apply to a specific subject, different engagement scores may be determined for a single subject and are then used to determine which intervention to execute for that subject.

Based on the risk models and intervention models, an operator can determine which subjects require intervention and select the appropriate interventions for the subjects. The operator can then queue these interventions, such as by scheduling emails for transmission and adding phone calls to a schedule for specialists (such as pharmacists). As these interventions are performed (such as emails being sent or calls being made), the fact of the intervention as well as the feedback from the subject regarding intervention is logged.

In addition, over time, the success of the intervention may be tracked based on whether the subject fills required prescriptions within a timely manner. One objective measure of success may be medication possession ratio (MPR), which may be calculated by the number of days of a prescription currently in the subject's possession divided by the number of total days initially supplied with the prescription. A higher MPR indicates that the subject is less likely to exhaust their supply of the drug.

A client of the operator, such as a health plan or medical practitioner, may access data about executed interventions (transmitted emails, placed phone calls, etc.) for their subjects. A web portal may allow the client (such as a health insurance representative) to review past interventions, execute their own interventions (such as placing a call to the subject's phone number), and log the interventions performed by the client. In addition, the client may be able to access data about the likelihood of engagement by the subject so that the client can make their own decisions, based on business logic, regarding executing interventions for particular subjects.

In FIG. 7A, intervention analysis for a selected subject begins at 702. For example, intervention analysis may start in response to a trigger based on a query score for the selected subject. For example, the trigger may be based on the query score falling below a predetermined threshold. In various implementations, the predetermined threshold may correspond to a specified cluster—for example, the trigger may occur when the query score or subject vector falls into the lowest cluster. In various implementations, there may be a time component to the trigger, such that the trigger occurs only once the query score falls into the lowest cluster twice with a space of at least 14 days between the query executions. Alternatively, or in addition, intervention analysis may be determined on a periodic basis, such as once per day, once per weekday, once per week, etc. In various implementations, the period may be selected by the user of the intervention system, such as a health insurer or enterprise.

At 702, control obtains prior intervention data, contact data, demographic data, and health data for the identified subject. At 704, control determines whether a time period since the last intervention is greater than a threshold. If not, control proceeds to 706 to wait for completion of the threshold time since the last intervention. For example, a minimum threshold time may be set between interventions so that a subject is not receiving intervention engagements every day, etc.

If the time since the last intervention is greater than the threshold at 704 (or if this is the first intervention), control proceeds to 708 to determine a channel-agnostic likelihood of engagement. The channel-agnostic likelihood of engagement may indicate a general likelihood of a subject responding to an intervention using any channel.

If the channel-agnostic likelihood is less than a threshold at 710, control proceeds to 712 to use a low engagement intervention process and attempt to identify a reason for the subject's lower engagement. For example, instead of using the basic intervention channels of the architecture, a specialist may identify other types of interventions that may be tried, additional subject data may be analyzed to identify alternative engagement outreach, etc. Identified or predicted reasons may be saved to improve the model, to improve intervention channel options, etc.

At 714, control determines a channel-specific likelihood of engagement for n channels. As an example, the channels may include a live call, an automated call, an email, a text message, etc. Control analyzes subject data to determine a risk score at 716. The risk score may be indicative of a likelihood of a future adverse event for the subject, such as a hospitalization event, a non-adherence event, a serious health event, a housing loss event, etc. The subject data may include data on a comorbidity condition for the subject, a length or frequency of non-adherence, a type of disease of the subject, economic security data (and/or other social determinants of health data), past claims or medical history data, etc. If the risk score is greater than a threshold at 718, control proceeds to 720 to schedule an intervention using the channel with the highest likelihood of engagement. For example, if a live call has the highest likelihood of engagement for a subject, and the subject has a high risk of a future adverse event, a live call may be scheduled without weighing costs, capacity, etc., because of the subject's high risk and the desire to engage with the subject as much as possible to avoid the adverse event.

Figure 7B:
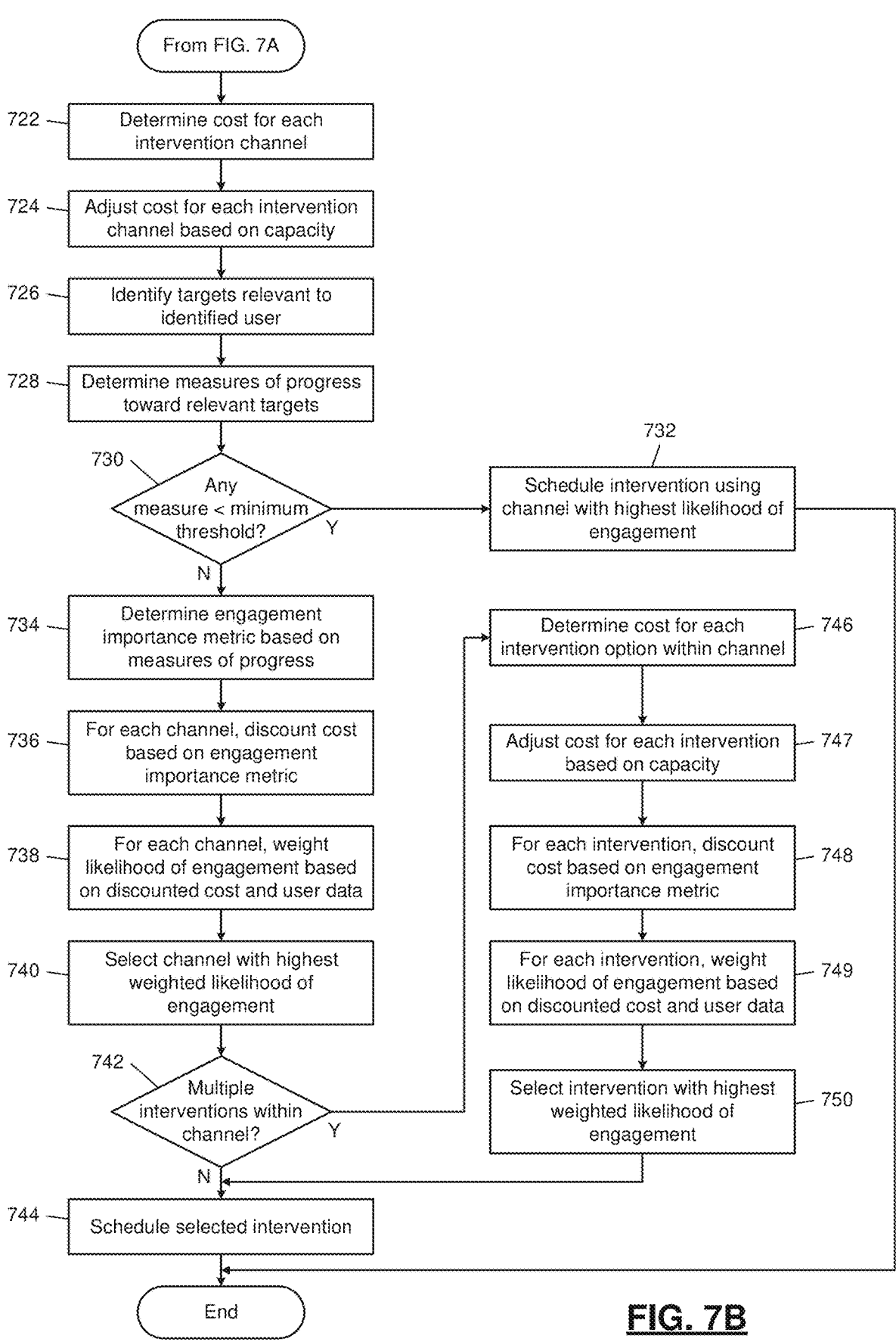

If the risk score is below the threshold, control proceeds to 722 in FIG. 7B. At 722, control determines a cost for each intervention channel, and adjusts the cost for each intervention channel based on capacity at 724. Live calls may be assigned a cost based on the salary, hourly wage, etc., of a specialist that performs the live calls, divided by an average number of calls that the specialist can perform during a specified time period. The capacity is also taken into account where a shortage of live call specialists may adjust the cost upwards for live call interventions, while a large supply of available live call specialists may adjust the cost downwards for live call interventions. Similar cost and capacity analysis may be performed on other intervention channels, and the costs and capacities may be analyzed and adjusted using any suitable approaches.

At 726, control identifies targets that are relevant to a subject. The subject may be part of a company health plan that has been offered a guarantee of at least eighty percent adherence for their members, the subject may be part of a group of diabetes patients where a guarantee has been made to keep the average A1C test results for the group below a specified threshold (e.g., below 8), etc.

Control then proceeds to 728 to determine measures of progress toward relevant targets. This may include analyzing objective targets and objective tracking data. As an example, if a target adherence level for a group that the subject belongs to is 80%, a measure of only 70% adherence for the group would indicate that the group is behind the target and therefore higher likelihood intervention channel(s) should be scheduled for the subject to increase the progress toward the target. In contrast, a measure of 90% adherence for the group would indicate that the group is ahead of the target and therefore lower likelihood intervention channel(s) may be scheduled to allow for allocation of higher cost channels to other subjects.

At 730, control determines whether any of the measures of progress for targets relevant to the subject are less than a minimum threshold. If so, control proceeds to 732 to schedule an intervention using the channel that has the highest likelihood of engagement. In the above example, if 80% adherence is the target value and 70% is a minimum threshold, a current group measure of only 60% adherence may require reaching out to the subjects with the highest likelihood channels in an attempt to more quickly raise the average adherence for the group above the minimum threshold and toward the target.

If there are no measures of progress towards target(s) that are below a minimum threshold, control proceeds to 734 to determine an engagement importance metric based on measures of progress. For example, if the measure of progress is below the target, the engagement importance metric may have a higher value because it is more important to engage the subject to bring the measure of progress back up for the relevant group. Conversely, if the measure of progress is above the target, the engagement importance metric may have a lower value because it is less important to engage the subject as the measure of progress is already high.

At 736, control discounts a cost of each channel based on the engagement importance metric. If the engagement importance metric has a high value (e.g., it is more important than average to engage the subject to try to raise the measure of progress towards the target), the cost of each channel may be discounted by a larger amount because the system is more willing to prioritize the expensive channels due to the need to raise the measure of progress. In contrast, if the engagement importance metric has a low value (e.g., it is less important than average to engage the subject because the measure of progress is already above the target), the cost of each channel may not be discounted at all, or by only a small amount, because the system has a lower priority for engaging this subject and may prefer to allocate higher cost resources to subjects in groups having lower measures of progress towards targets.

Control then proceeds to 738 to weight the channel-specific likelihood of engagement for each channel, based on the discounted cost and the subject data. The weighting may take into account any subject data, such as a refill cost to the subject, a pill burden of the subject, comorbidity information about the subject, etc. This can be combined with the discounted costs determined at 736 (which take into account resource and cost constraints for the different channels, in addition to measures of progress toward relevant cost), in order to adjust weights of the channel-specific likelihoods determined at 714 (e.g., intervention likelihoods from the channel-specific intervention models).

At 740, control selects the channel with the highest weighted likelihood of engagement. For example, the intervention system may include one or more models that perform the weighting adjustment of step 738 (in addition to any other suitable elements of the flowchart of FIGS. 7A and 7B), and the intervention system may then select the channel that has the highest weighted likelihood at 740. The intervention system may include any suitable model(s), such as a linear programming optimizer model, a logistic regression model, a decision tree model, a random forest model, a heuristic model, etc.

If the selected channel does not include multiple interventions at 742, control proceeds to schedule the selected intervention at 744. However, some channels may include multiple interventions within the single channel. For example, live or automated calls may follow different predefined scripts depending on how the subject responds during the call, emails or text messages may have different text options, etc.

If the selected channel has multiple intervention options at 742, control proceeds to 746 to determine a cost for each intervention option within each channel. For example, a longer or more complex call script may increase the likelihood of engaging a subject even though the longer or more complex call script is more costly due to the increased time for a specialist to be on the call. In some channels, the cost for each intervention option may be approximately the same (e.g., an email or text message cost is similar regardless of the text of the message).

At 747, control adjusts the cost for each intervention option based on the available capacity. At 748, control discounts the cost of each intervention option based on the engagement importance metric (e.g., the engagement importance metric determined at 734). Adjusting and discounting the cost of each intervention option based on capacity and the engagement importance metric may be similar to steps 724 and 736, but applied to each intervention option within a single channel.

At 749, control weights, for each intervention option within the selected channel, the likelihood of engagement based on the determined discounted cost and the subject data. Control then selects the intervention option with the highest weighted likelihood of engagement at 750. For example, multiple variations of scripts, message texts, etc., may be generated and test for success rates over time (e.g., success of producing subject engagement, etc.).

In addition to determining a channel-specific likelihood of engagement, the intervention system may also output engagement likelihoods for each intervention option within a channel. Control selects the intervention option with the highest likelihood of engagement at 750 and schedules the selected intervention option at 744. Control then ends.

Executable Sequences

Figure 8:
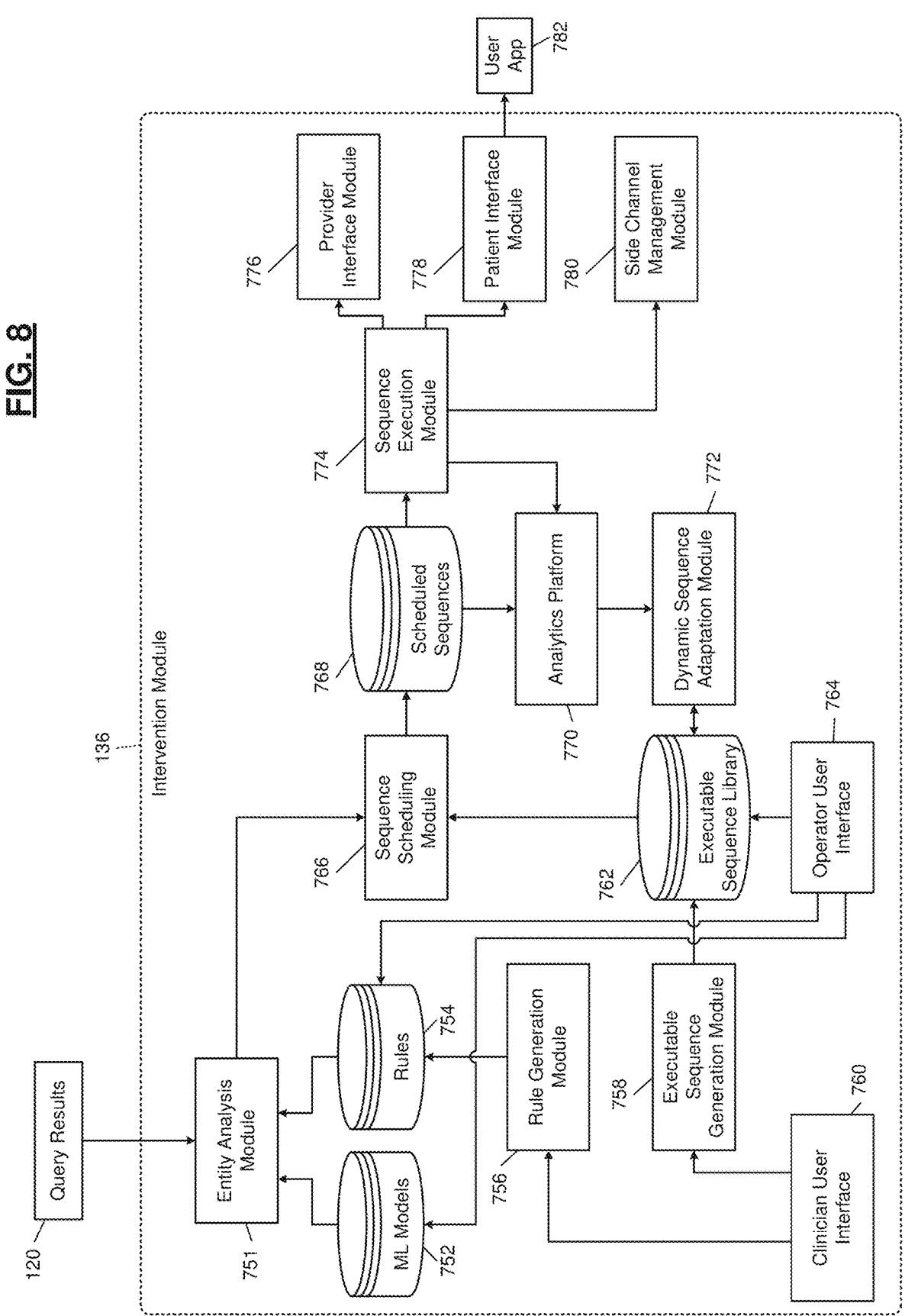
FIG. 8 is a functional block diagram of an example implementation of an intervention module.

In FIG. 8, an example implementation of the intervention module 136 includes an entity analysis module 751. The entity analysis module 751 determines relevant states for an entity (i.e., subject), such as a specific patient. This state determination may be based on rules in a rules data store 754 and/or machine learning (ML) models 752. The entity analysis module 754 may evaluate the rules of the rules data store 754 and/or provide inputs to the ML models 752 based on the scores and/or cluster obtained from query results 120 for the entity. The obtained data may include the score(s), the vector, and/or the cluster(s) associated with the entity, etc.

The entity analysis module 751 may determine, as an example, whether the entity is associated with a specific cluster or score. If so, one set of states may be available; otherwise, a second set of states may be available. Once one or more states is determined for the entity, these states are provided to a sequence scheduling module 766. The sequence scheduling module 766 retrieves executable sequences from an executable sequence library 762 based on the designated states. These sequences are scheduled for execution into a scheduled sequences data store 768. For example, the scheduled sequences data store 768 may include specific dates and times when actions will be executed, or may specify periodic intervals.

These actions may include obtaining a reading (such as blood pressure or heart rate), requesting user input, suggesting survey questions, presenting an educational video, offering access to a clinician, scheduling attendance at a webinar, presenting a list of actions the user can take over a period of time, communication from the entity to a provider, and communication from the provider to the entity. In various implementations, a scheduled action may include a provider, such as a pharmacist or pharmacy tech, reaching out to the entity regarding a prescription to increase adherence. In various implementations, an automated communication may be provided to the entity, such as via email, text message, or on-device notification.

An analytics platform 770 tracks information about which actions are scheduled and which actions are executed. The analytics platform 770 may provide data to a dynamic sequence adaptation module 772 to personally adapt the executable sequences in the executable sequence library 762 to the user. For example, based on information regarding how frequently the entity responds to notifications at different times of the day, the dynamic sequence adaptation module 772 may revise certain actions within certain executable sequences to adjust the time of day to increase engagement.

A sequence execution module 774 is responsible for executing actions that have been scheduled in the scheduled sequences data store 768. Examples of execution mechanisms include a provider interface module 776, a patient interface module 778, and a side channel management module 780. The provider interface module 776 may interact with one or more providers to request that the provider initiate communication with the entity. For example, this communication may be a phone call from a pharmacist to discuss medication, a scheduling text message from the office staff of a clinician to schedule an appointment, etc.

The patient interface module 778 is responsible for communications through a user app 782. For example, these communications may be notifications within the user app 782 and notifications presented to an operating system of the user device (within which the user app 782 is operating). The user app 782 may provide a primary interface to a user (in the healthcare context, the user may be referred to as a patient). The user app 782 is installed on a user device of the user, such as a smartphone. The user app 782 may be downloaded from a digital distribution platform, such as the App Store from Apple Inc. or the Play store from Alphabet Inc. A user interacts with the user app 782 via the user device (not shown in FIG. 3B for simplicity).

The side channel management module 780 initiates communication with an entity via a mechanism other than the user app 782. For example, these communication mechanisms or channels may include email, text message, prerecorded call, fax, postal mail, in-browser notifications, etc. In various implementations, the user app 782 presents a query to a user and solicits responses to each element of the query.

In various implementations, a rule generation module 756 generates rules for the rules data store 754 and/or the intervention module 136 generally. These rules may be informed by clinician input received from a clinician user interface 760. For example, the clinician user interface 760 may provide a clinician with the ability to choose clusters or query elements and set satisfaction criteria for those inputs. For example, satisfaction criteria may include upper thresholds, lower thresholds, ranges, etc. The rule generation module 756 encodes these inputs into rules for the rules data store 754 and/or the intervention module 136 generally.

Similarly, an executable sequence generation module 758 may generate executable sequences for the executable sequence library 762 based on input from the clinician user interface 760. For example, the clinician may specify which actions should be taken for each state in which the entity can be found.

In various implementations, the clinician user interface 760 may directly control executable sequences in the executable sequence library, using a low-code or no-code programming interface. Similarly, the clinician user interface 760 may directly control satisfaction criteria within the rules data store 754 and/or the intervention module 136 generally. In various implementations, the rules data store 754, rule generation module 756, executable sequence library 762, and/or the executable sequence generation module 758 may be implemented using the Camunda workflow system or the Amazon Web Services (AWS) step functions workflow system from Amazon Web Services, Inc.

An operator user interface 764 may allow an operator to control the executable sequence library 758 and/or the rules of the rules data store 758. For example, the operator may manipulate satisfaction criteria or executable actions based on an understanding of the conditions desires as well as parameters of the system. The operator user interface 764 may also allow an operator to control training of the ML models 752. For example, only the operator may provide training samples from a clinician's evaluation of an entity. The ML models 752 may then supplant the rules of the rules data store 764.

In various implementations, feedback from clinicians regarding how accurately states have been assigned may be fed back to the ML models 752 as training data. The feature vectors for the ML models 752 may include a subset or a superset of the conditions evaluated by the rules of the rules data store 754. For example, the ML models 752 may include additional features not specified by any of the rules of the rules data store 754 and a significance analysis (such as a principal components analysis) of the features may allow a reduced feature vector to be used by the ML models 752. This feature vector may match or, in some cases, may demurrage from the set of inputs that dictate operation to rules of the rules data store 754.

Figure 9:
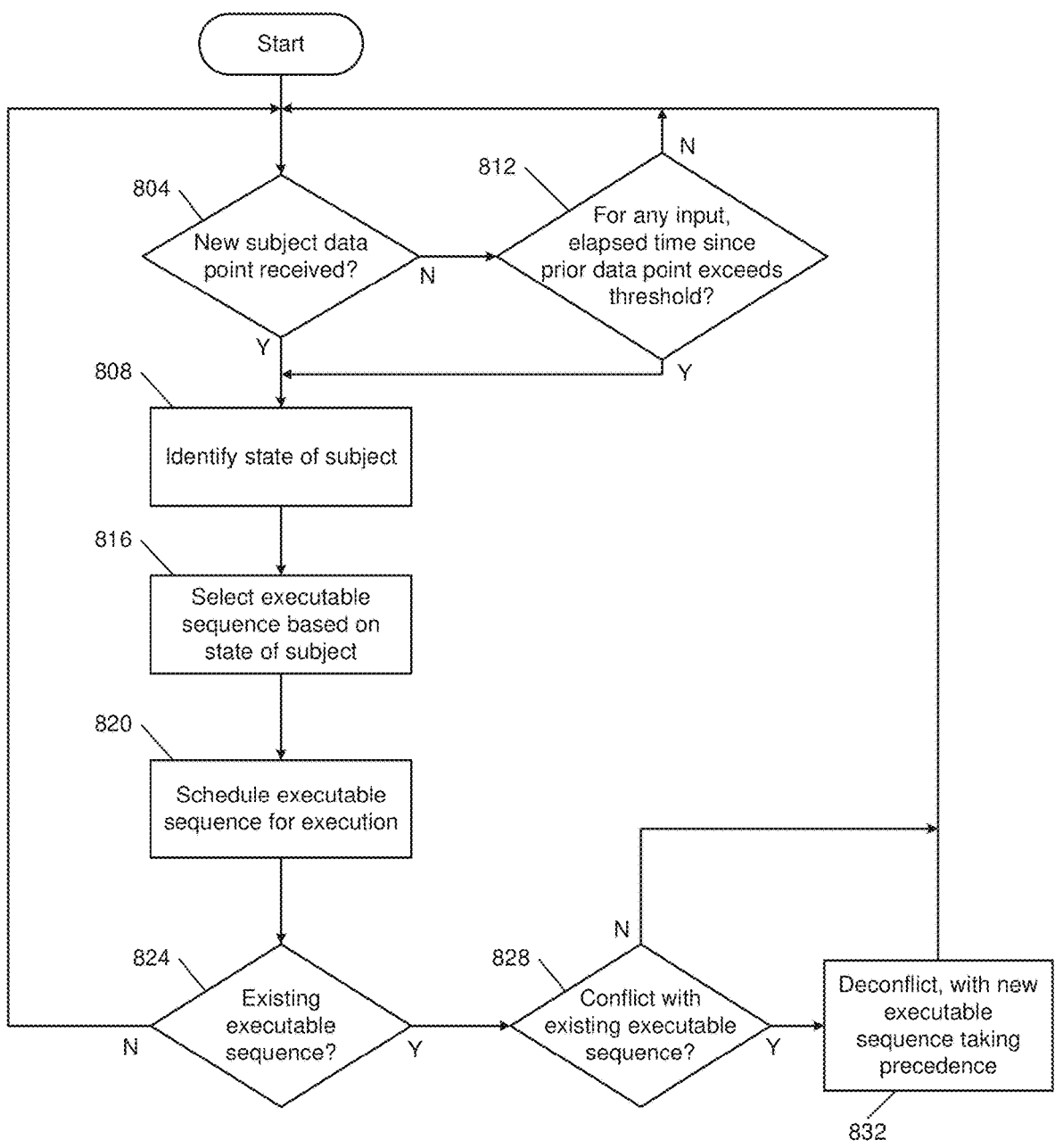
FIG. 9 is a flowchart of example analysis and scheduling operation for care decision management.

FIG. 9 is a graphical illustration of operation of the intervention module 136. In various implementations, the flow corresponds to some of the operations performed by the entity analysis module 751 and the sequence scheduling module 768. Control begins at 804, where control determines whether a new data point is available. If so, control transfers to 808; otherwise, control transfers to 812. The new data point may be a new query result for a subject (i.e., new query score, new query closure, new vector, etc.).

At 812, control determines whether, for any input, the elapsed time since the most recent data point exceeds a certain threshold. If so, control transfers to 808; otherwise, control returns to 804. For example, each query element may have a different threshold. As one example, intervention analysis may be determined on a periodic basis, such as once per day, once per weekday, once per week, etc. In various implementations, the threshold may be selected by the user of the intervention system, such as a health insurer or enterprise.

Figure 10:
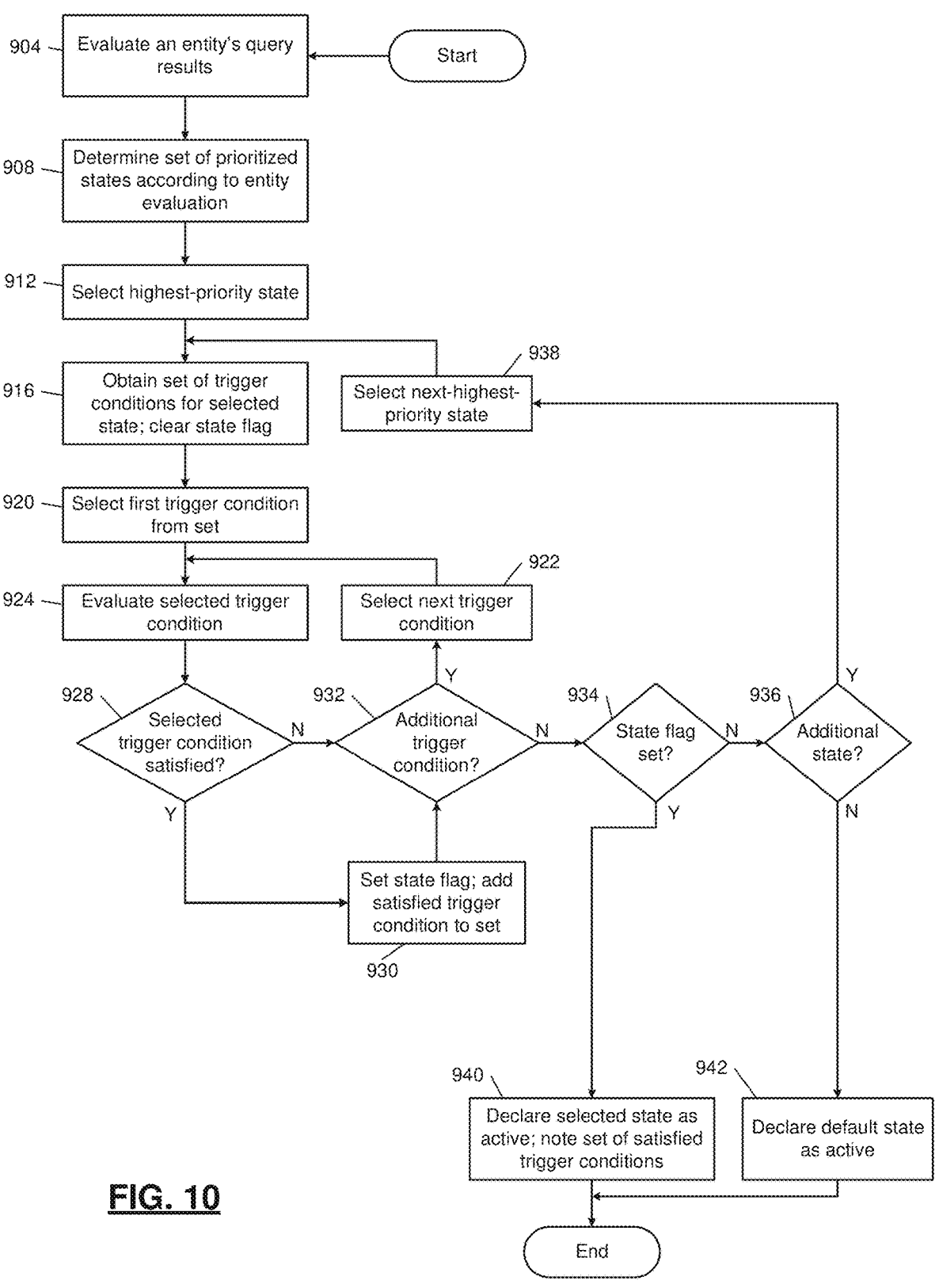
FIG. 10 is a flowchart of example state determination of an entity for use in selecting an executable sequence.

In 808, control identifies the state of the subject (such as a patient). For example, the state of the subject may be determined as shown in FIG. 10. Control continues at 816, where control selects an executable sequence based on the state of the subject. For example, there may be a one-to-one or many-to-one correspondence from identified states to executable sequences.

Control continues at 820, where control schedules the selected executable sequence for execution. For example only, the executable sequence may include notifications to watch an educational video. These notifications may be encoded such that they generate notifications on a user device or generate other forms of reminders, such as text messages, emails, etc. At 824, control determines whether there is an existing executable sequence already scheduled for the subject. If so, control transfers to 828; otherwise, control returns to 804.

At 828, control determines whether there is a conflict between the existing executable sequence and the new executable sequence. If so, control transfers to 832; otherwise, control returns to 804. At 832, control deconflicts the new executable sequence with the existing executable sequence. For example, a previous executable sequence may have specified reading an informational document regarding effects obesity while the new executable sequence specifies watching an educational video regarding body mass index (BMI). To deconflict these two, the new executable sequence may take precedence with watching the educational video. In various implementations, deconfliction may be skipped entirely and the previous executable sequence may simply be removed in favor of the new executable sequence. However, deconfliction may be beneficial in situations where executable sequences are scheduled for different elements. Following 832, control returns to 804.

In FIG. 10, example operation for identifying the state of a subject begins at 904. At 904, control evaluates the query results of a subject. In various implementations, this evaluation may simply include determining whether a score, or an element of the score, for the subject meets certain criteria. For example, the criteria may include an element being above a specified threshold, being below a specified threshold, being with a specified range, an element having been clustered into a specified cluster, etc. The evaluation may also include determining whether a score vector meets certain criteria, such as being greater than or less than a specified distance (such as a Euclidean distance) from one or more defined vectors.

At 908, control determines a set of prioritized states according to the subject evaluation. For example, normal, intervention, and escalation states may be present for a first element and a separate set of normal, intervention, and escalation states may be defined for second element. As a simplistic example, a vector indicative of extremely low vitality may be defined and the criteria may be a defined distance away from that vector, such that query results being less than the defined distance away from that vector will result in the escalation state. In other implementations, the score or an element of the score falling into a lowest cluster (where "lowest" means least optimal) may result in the escalation state.

At 912, control selects the highest priority state from among the set. For example, the escalation state may be higher priority than the intervention state while the intervention state is higher priority than the normal state. In other words, in various implementations, if one element would lead to a selection of the normal state, but another element would lead to a selection of the escalation state, the escalation state is selected.

At 916, control obtains a set of trigger conditions for the selected state. Control also clears the state flag. The state flag is used to indicate whether the current state should be selected for the subject. The state flag is set so that each triggering condition can be evaluated and reported when the state is selected.

At 920, control selects the first trigger condition from the set. At 924, control evaluates the selected trigger condition to determine whether the satisfaction criteria of the selected trigger condition are met. For example only, the satisfaction criteria may include a calculation, a threshold, a range, a qualitative analysis, a natural language processing (NLP) evaluation of a textual input, etc.

At 928, if the evaluation determined that the selected trigger condition was satisfied, control transfers to 930; otherwise, control transfers to 932. At 930, Control sets the state flag indicating that the current state has experienced at least one current condition. Control then adds the satisfied triggered condition to a set for reporting purposes. Control then continues at 932. Control determines whether there are any additional trigger conditions for evaluation. If so, control transfers to 922, where the next trigger condition is selected and control continues at 924.

If no trigger conditions for the state remain, control transfers to 934. At 934, if the state flag is set, control transfers to 940 where the selected state is declared as active and the set of satisfied trigger conditions is noted. For example, a clinician may use the set of satisfied triggered conditions when evaluating next best actions for the entity. Control then ends. For example, control may end by returning to FIG. 9.

At 934, if the state flag is not set, control transfers to 936. At 936, if there is an additional state to evaluate, control transfers to 938, where the next-highest-priority state is selected and control continues at 916. If, at 936, there are no additional states, control transfers to 942, where the default state is declared as active. For example, the default state may be referred to as a stable, normal, or baseline state. In various implementations, the default state may correspond to an executable action sequence having the fewest actions with the longest intervals between the actions. Control then ends.

Research

A query generated as described above may be used to assess vitality of one or more entities in a population. For example, the following hypotheses have found support when tested using social science research: vitality is a comprehensive proxy for health and well-being; the concept of vitality resonates with consumers; vitality can be measured and consumers are amenable to it; by measuring it, the drivers of vitality can be identified; and employers can play a role in employee vitality and benefit from doing so.

Research has also confirmed that consumers see vitality as: multidimensional, a reflection of body, mind, and other dimensions working together; a type of fuel or energy that drives or powers their thoughts, actions, and emotions in positive and intentional ways; something that can rise and fall as a result of various factors; and a familiar concept, with 3 in 4 reporting at least a good understanding about concept of vitality. As a result, vitality is a topic of interest to consumers. Vitality can be seen as a proxy for overall health and well-being, and may be a credible health measure based on perception that it's link to multiple dimensions and levers for actions.

Research confirmed that consumers see the value of vitality in driving positive outcomes: energy, joy, happiness; motivation to pursue their goals and passions, and the confidence and courage to do so; resilience in the face of stress, negatively, and adversity; more creative and productive at home and work; and adoption of healthy behaviors related to health and well-being.

Meanwhile, the impact of not having vitality may include: difficulty concentrating; engaging in behaviors that compromise nutrition, sleep and exercise; lack of enthusiasm, engagement, positive attitude; and work completion that is only adequate or sub-par. As a result, vitality resonates with consumers who feel it empowers them to be a better version of themselves at home, at work, and in their community. In other words, the value of vitality expands beyond individuals and into communities.

Research confirmed that consumers welcome the idea of measuring and tracking vitality and believe that measuring vitality may allow them to track their progress towards overall health, encourage them to engage in efforts to improve their health, help them discern what factors are hindering their vitality, and enhance their quality of life and make them a better person. People who hesitated about measuring their vitality wondered if they can do so on their own. Given the high interest, it is likely that consumers will be receptive and engaged in conversations and activities regarding vitality. This validates the concept of using the vitality measurement as a motivational tool to engage with consumers and employees.

Research confirmed that vitality is at the center of a dynamic and complex system of well-being. Vitality and overall well-being are impacted by interdependent domains of wellness and the satisfaction of three basic human needs of autonomy, competence, and connectedness. Consumers believe that vitality is facilitated by mental health, physical health, sleep, spiritual life, the environment, and social relationships.

Consumers would be willing to focus on improving lifestyle behaviors such as diet, exercise, sleep, social interactions, and work-life balance to improve their vitality. This gives confidence that the drivers of vitality can be identified. Additional research will increase understanding of the drivers of vitality to inform resources, tools, and interventions that help maintain and enhance vitality.

Research showed that vitality levels are higher for consumers who feel they have a positive and supportive work environment, can work efficiently, and focus on results. Individuals who feel "mentally somewhere else" or were not feeling well at work have lower levels of vitality. Lowest levels of vitality are seen for those dissatisfied with their access to health care and to job opportunities. In some studies, many consumers believe employers can help improve their vitality. Relationships between vitality levels and key health and job performance metrics exist and merit further study to identify opportunities for employers to play a more meaningful and active role in impacting employees' vitality.

Some factors may have the potential to impact multiple domains of wellness. For example, consumers felt that lack of sleep left them feeling: physically unwell (impacting their physical wellness); unable to concentrate (impacting their intellectual wellness); and moody and frustrated (impacting their emotional wellness).

Consumers felt that engaging in physical activity: increased their physical energy and improved their health (impacting their physical wellness); helped them to feel more alert and focused (impacting their intellectual wellness and occupational wellness); and improved their mood (impacting their emotional wellness).

Consumers felt that illness, injuries, or disease have at times: prevented them from working (impacting occupational wellness and financial wellness); caused them to feel pain or discomfort (impacting their physical wellness); and left them overwhelmed or depressed (impacting their emotional wellness).

Consumers felt that work responsibilities extending beyond a standard work-week schedule: takes time away from their ability to exercise or plan for healthy meals (impacting their physical wellness); prevents them from spending time with friends and family (impacting their social wellness); leaves them feeling anxious and overwhelmed (impacting their emotional wellness); and prevents them from completing their work tasks with the quality and attention they would if they had more time (impacting their occupational wellness).

Research findings reveal that the satisfaction of three basic human needs impacts vitality and well-being. These basic human needs can be labeled autonomy, competence, and relatedness. Autonomy refers to the need to feel ownership of one's behavior. Competence refers to the need to demonstrate mastery and produce desired results. Relatedness refers to the need to feel connected to others.

Examples of Generated Queries

A 38-element vitality query may include 6 domain-independent elements plus 4 elements for each of 8 domains. For example only, the 6 domains may be physical, emotional, financial, social, environmental, and intellectual. In various implementations, some of the 4 elements may correspond to different subscales within a domain. For example, the subscales may include autonomy, competence, and relatedness. For example only, the 6 domain-independent elements may include a predetermined set of 6 elements referred to as subjective vitality scales (SVS)-6.

A 10-element vitality query may include 3 domain-independent elements plus 1 element for each of 6 domains and 1 additional element from one of the 6 domains. In various implementations, the 6 domains include a physical domain and the additional element is chosen from the physical domain. For example only, the 3 domain-independent elements may include a predetermined set of 3 elements from SVS-6. The 10-element vitality query may be more broadly applied and, depending on results of the query, may be used to trigger execution of a higher-element query, such as the 38-element vitality query.

A 5-element vitality query may be used more broadly, including being available publicly for execution on demand. A 4-element vitality query may also be determined for situations where 4 elements are preferable to 5. A 3-element vitality query may be determined and/or adapted from existing literature. For example only, the elements of the 3-element vitality query may be the same as the 3 domain-independent elements in the 10-element vitality query. Finally, another 3-element vitality query may be determined, such as by choosing a subset of the elements from the 38-element query.

In various implementations, each of the vitality queries may request a numeric input for each element—for example, an integer from 1 to 7 that corresponds to a scale of not at all true (a numeric 1) through somewhat true (a numeric 4) to very true (a numeric 7).

As one example of a 38-element vitality query, the following 38 string literals may be used as the elements, with each separated by a semicolon: I feel alive and vital; Sometimes I feel so alive I just want to burst; I have energy and spirit; I nearly always feel alert and awake; I feel energized; I look forward to each new day; Keeping myself physically healthy is important to me; I choose to prioritize my physical health; I'm confident I can achieve my physical wellness goals; I have all the skills and tools necessary to live a healthy life; I am glad to be with the people I end up spending time with; I make time for my relationships because I want to; I have the social skills I need to make friends; I can successfully build connections with others; I really value learning new things and understanding more and more; I am a curious person who enjoys researching new things; I feel capable of achieving the learning and education I want; I can successfully engage with fresh ideas and learn new concepts; I am in control of how I react in times of stress; I am comfortable that I don't need to be in control of my emotions in any moment, I can just let them "be"; I feel capable of managing my emotions; I have a reliable emotion regulation skill set; I have actively chosen to pursue a life with a higher purpose; My spiritual growth is personally important to me; I am able to understand spiritual ideas and teachings; I am successfully pursuing a path of meaning and spiritual growth; I have the freedoms and opportunities to financially support myself; I like to set and manage my own financial goals; I am confident I can live well within my means; I have the skills and knowledge to manage my money; When I need them, I have places I go that bring me a sense of peace; I have actively shaped my physical surroundings to fit my tastes; I have been able to secure good, safe places to live; I know places I can always go in which I feel safe and well; I value and enjoy my work; At work, I am often pursuing tasks that interest me; I feel capable at my work; I am confident I can do my job well.

As one example of a 10-element vitality query, the following 10 string literals may be used as the elements, with each separated by a semicolon: I feel energized; I look forward to each new day; I feel alive and vital (SVS); I choose to prioritize my physical health; I have all the skills and tools necessary to live a healthy life; I can successfully build connections with others; I really value learning new things and understanding more and more; I feel capable of managing my emotions; I have the freedoms and opportunities to financially support myself; I know places I can always go in which I feel safe and well.

As one example of a 5-element vitality query, the following 5 string literals may be used as the elements, with each separated by a semicolon: I feel energized (SVS); I choose to prioritize my physical health; I feel capable of achieving the learning and education I want; I feel capable of managing my emotions; I know places I can always go in which I feel safe and well.

As one example of a 4-element vitality query, the following 4 string literals may be used as the elements, with each separated by a semicolon: I feel alive and vital; I have all the skills and tools necessary to live a healthy life; I can successfully build connections with others; I feel capable of managing my emotions.

As one example of a 3-element vitality query, the following 3 string literals may be used as the elements, with each separated by a semicolon: I feel alive and vital; I feel energized; I have energy and spirit. The set of these three particular elements may be known in the prior art. As another example of a 3-element vitality query, the following 3 string literals may be used as the elements, with each separated by a semicolon: I feel alive and vital; I have all the skills and tools necessary to live a healthy life; I can successfully build connections with others.

The presently described query systems and methods can be used with the Survey and Suggestion System described in U.S. patent application Ser. No. 18/204,798, filed 1 Jun. 2023, and U.S. patent application Ser. No. 18/205,388, filed 2 Jun. 2023, which are both hereby incorporated by reference. The present query and scoring systems and methods can be used to provide healthcare pathways or suggested treatments.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements.

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR. The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuitry." In this application, the term "controller" can be replaced with the term "module." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that stores code executed by the processor hardware; other suitable hardware components that provide the described functionality; or a combination of some or all of the above, such as in a system-on-chip; each of these can be components of the presently described systems and operate to enable the described functions.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The code can also include the instructions described herein and the process steps of the methods described herein. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. When the processor(s) are loaded with instructions to execute tasks described herein, they are dedicated machines to executing an embodiment described herein.

The memory hardware may also store data together with or separate from the code and be a component of the systems described herein. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special-purpose computer created by configuring a general-purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special-purpose computer, device drivers that interact with particular devices of the special-purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A query generation system comprising:

memory hardware configured to store instructions; and processor hardware configured to execute the instructions from the memory hardware, wherein the instructions include:

obtaining a definition of a query, wherein the definition specifies a number of elements of the query;

identifying a set of candidate query elements for the query, wherein each candidate of the set of candidate query elements corresponds to a domain of a plurality of domains;

for each respective domain in the plurality of domains:

based on the number of elements of the query and a total quantity of domains in the plurality of domains, determining a corresponding target number of query elements for the respective domain;

determining whether a number of query elements assigned to the respective domain exceeds the corresponding target number of query elements; and in response to a determination that the number of query elements assigned to the respective domain exceeds the corresponding target number of query elements, optimizing a selection of query elements from among the set of candidate query elements for the plurality of domains, wherein:

the optimization is targeted to maximize at least one of internal consistency of the selected query elements and correlation of the selected query elements with a reference query, the optimization accesses data from prior queries to calculate the at least one of the internal consistency and the correlation, and the optimization selects a number of query elements for the respective domain equal to the corresponding target number of query elements;

storing the selected query elements for the plurality of domains; and transmitting information identifying the selected query elements to a query execution system, wherein the query execution system is configured to:

present the selected query elements of the query to a subject, obtain an input for each of the selected query elements, determine a score for the query based on the inputs for the selected query elements, in response to a determination that the score for the query is below a threshold score, determine whether a first time period has elapsed, and in response to a determination that the first time period has elapsed:

determine a risk score, determine a set of engagement likelihoods for a set of communication channels, and based on the risk score and the set of engagement likelihoods, automatically transmit a first communication.

2. The query generation system of claim 1 wherein the optimization is performed using a genetic algorithm.

3. The query generation system of claim 1 wherein the internal consistency is assessed based on Cronbach's alpha.

4. The query generation system of claim 1 wherein the correlation is based on a Pearson correlation coefficient.

5. The query generation system of claim 1 wherein the reference query includes the number of elements that is larger than the number of elements of the query.

6. The query generation system of claim 1 wherein the instructions include:

determining weights for each of the plurality of domains based on regression coefficients for the selected query elements; and transmitting the weights to the query execution system to allow query results to be weighted in determining a query score.

7. The query generation system of claim 1 wherein the identifying the set of candidate query elements includes performing principal component analysis (PCA) on the set of candidate query elements to determine correspondence with the plurality of domains.

8. The query generation system of claim 1 wherein:

a first domain of the plurality of domains includes multiple subscales; and the set of candidate query elements corresponding to the first domain respectively correspond to the multiple subscales.

9. The query generation system of claim 8 wherein the instructions include performing exploratory factor analysis (EFA) to determine which of the multiple subscales the set of candidate query elements correspond to.

10. The query generation system of claim 8 wherein the instructions include performing factor analysis (FA) to determine a number of the multiple subscales for the first domain.

11. The query generation system of claim 1 wherein:

values provided for the selected query elements of the query are aggregated into a score for the query; and the instructions include determining one or more clusters for the score.

12. The query generation system of claim 11 wherein:

determining the one or more clusters for the score includes transforming the score from a first scale to a second scale; and the second scale is numeric.

13. The query generation system of claim 12 wherein:

the first scale is numeric and covers a first range of numbers;

the second scale covers a second range of numbers; and the first range and the second range are not coextensive.

14. The query generation system of claim 11 wherein determining the one or more clusters for the score includes determining numeric thresholds separating the one or more clusters.

15. The query generation system of claim 14 wherein a first threshold of the numeric thresholds is determined based on a mean over multiple iterations using different samples, a linear combination of previous query scores and a standard deviation of the previous query scores.

16. The query generation system of claim 15 wherein the multiple iterations are performed using bootstrap resampling of a population of the previous query scores.

17. The query generation system of claim 1 wherein:

values provided for the selected query elements of the query are transformed into a vector in a multidimensional vector space; and the instructions include determining clusters for the vector.

18. The query generation system of claim 17 wherein determining the clusters for the vector includes determining Euclidean distance between the vector and the clusters.

19. The query generation system of claim 1 wherein;

each candidate of the set of candidate query elements corresponds to one of the plurality of domains, and the candidate query elements are string literals.

* * * * *